United States Patent [19]

Glaser et al.

[11] Patent Number: 5,875,242
[45] Date of Patent: Feb. 23, 1999

[54] TELECOMMUNICATIONS INSTALLATION AND MANAGEMENT SYSTEM AND METHOD

[76] Inventors: Lawrence F. Glaser, 10705 Averett Dr., Fairfax Station, Va. 22039; Brian E. Stowers, 8315 Botsford Ct., Springfield, Va. 22152

[21] Appl. No.: 686,942

[22] Filed: Jul. 26, 1996

[51] Int. Cl.$^6$ .................................................. H04M 1/64
[52] U.S. Cl. .......................... 379/207; 379/221; 379/279; 379/88.17
[58] Field of Search .................................. 379/225, 279, 379/14, 201, 207, 221, 67, 88, 89, 112, 114, 115; 395/200.51, 200.5, 830, 828

[56] References Cited

U.S. PATENT DOCUMENTS

| | | | |
|---|---|---|---|
| Re. 35,050 | 10/1995 | Gibbs et al. | 379/93 |
| 4,196,316 | 4/1980 | McEowen et al. | 379/165 |
| 4,431,870 | 2/1984 | May et al. | 379/357 |
| 4,456,790 | 6/1984 | Soyack | 379/102 |
| 4,491,693 | 1/1985 | Sano et al. | 379/156 |
| 4,517,409 | 5/1985 | Nagasaki | 379/156 |
| 4,570,035 | 2/1986 | Pinede et al. | 379/164 |
| 4,595,800 | 6/1986 | Nagatomi et al. | 379/165 |
| 4,602,132 | 7/1986 | Nagatomi et al. | 379/159 |
| 4,605,825 | 8/1986 | Komuro et al. | 379/165 |
| 4,741,026 | 4/1988 | Baxter et al. | 379/204 |
| 4,744,103 | 5/1988 | Dahlquist et al. | 379/247 |
| 4,747,127 | 5/1988 | Hansen et al. | 379/94 |
| 4,748,656 | 5/1988 | Gibbs et al. | 379/93 |

(List continued on next page.)

OTHER PUBLICATIONS

"NetPlus Telephony Management System: Accounting Management, Configuration Management, Fault Management, Product Backplane" ACE Comm, No. N96–1252 Date= unknown.
"Network Solutions That Work", No. A973648 Date= unknown.
"AceComm's Right Connections", *Washington Post*, Oct. 27, 1997.
"NetPlus® Telephony Management System", No. N96–1379 Date: unknown.
"Full Service Maintenance, Net*Comm Division", No. N96–0180 Date: unknown.
"NetPlus—A Full–Service Approach to Network Management", No. N96–1378 Date: unknown.
"Technical Supprot Service Net*Comm Division", No. N96–1375 Date: unknown.

(List continued on next page.)

*Primary Examiner*—Fan S. Tsang
*Attorney, Agent, or Firm*—Sixbey, Friedman, Leedom & Ferguson, PC; Charles M. Leedom, Jr.; Eric J. Robinson

[57] ABSTRACT

A telecommunications system installation and management device and method for managing, controlling, updating and monitoring telecommunications devices, such as a private branch exchange telephone switch, voice messaging system, call accounting system, central office telephone switch, router, bridge, hub, or associated peripheral telecommunications equipment. The device is capable of managing and controlling a plurality of different types of telecommunications equipment provided by various different manufacturers to thereby seamlessly integrate the equipment into an easily managed telecommunications system. A local database within the telecommunications system provides for real-time or near real-time access and modification of programming information for the telecommunications equipment and further provides for redundancy in the event that the telecommunications equipment should fail. A single point of control for system management and data entry is provided in an integrated application that reduces the amount of necessary data to be entered and that facilitates user modifications and changes to operating parameters. The system preferably actively maintains a live connection with each of the managed devices.

63 Claims, 8 Drawing Sheets

Microfiche Appendix Included
(4 Microfiche, 358 Pages)

U.S. PATENT DOCUMENTS

| Number | Date | Name | Class |
|---|---|---|---|
| 4,763,353 | 8/1988 | Canale et al. | 379/157 |
| 4,782,517 | 11/1988 | Bernardis et al. | 379/201 |
| 4,811,388 | 3/1989 | Westerhof et al. | 379/229 |
| 4,821,316 | 4/1989 | Okumura et al. | 379/156 |
| 4,866,758 | 9/1989 | Heinzelmann | 379/94 |
| 4,897,866 | 1/1990 | Majmudar et al. | 379/94 |
| 4,899,373 | 2/1990 | Lee et al. | 379/207 |
| 4,905,274 | 2/1990 | Cooper et al. | 379/157 |
| 4,928,304 | 5/1990 | Sakai | 379/94 |
| 4,932,022 | 6/1990 | Keeney et al. | 379/96 X |
| 4,974,255 | 11/1990 | Defay et al. | 379/106 |
| 5,027,391 | 6/1991 | O'Neill et al. | 379/373 |
| 5,048,080 | 9/1991 | Bell et al. | 379/165 |
| 5,049,873 | 9/1991 | Robins et al. | 340/825.06 |
| 5,062,103 | 10/1991 | Davidson et al. | 379/94 X |
| 5,062,133 | 10/1991 | Melrose | 379/94 |
| 5,097,528 | 3/1992 | Gursahaney et al. | 379/67 |
| 5,119,413 | 6/1992 | Okumura et al. | 379/156 |
| 5,195,086 | 3/1993 | Baumgartner et al. | 379/202 X |
| 5,274,630 | 12/1993 | Jestice et al. | 370/360 |
| 5,276,727 | 1/1994 | Kim et al. | 379/29 |
| 5,309,509 | 5/1994 | Cocklin et al. | 379/165 |
| 5,311,577 | 5/1994 | Madrid et al. | 379/93 |
| 5,315,647 | 5/1994 | Araujo | 379/265 |
| 5,317,630 | 5/1994 | Feinberg et al. | 379/94 |
| 5,325,422 | 6/1994 | Ladd | 379/67 |
| 5,355,404 | 10/1994 | LeDuc et al. | 379/201 |
| 5,369,696 | 11/1994 | Krauss et al. | 379/268 |
| 5,386,459 | 1/1995 | Veeneman et al. | 379/93 |
| 5,388,258 | 2/1995 | Larsson et al. | 395/600 |
| 5,402,477 | 3/1995 | McMahan et al. | 379/201 |
| 5,420,917 | 5/1995 | Guzuran | 379/279 |
| 5,455,852 | 10/1995 | Elrod et al. | 379/67 |
| 5,463,682 | 10/1995 | Fisher et al. | 379/201 |
| 5,465,294 | 11/1995 | Chapman, Jr. et al. | 379/207 |
| 5,469,498 | 11/1995 | Abe et al. | 379/127 |
| 5,469,500 | 11/1995 | Satter et al. | 379/201 |
| 5,469,503 | 11/1995 | Butensky et al. | 379/265 |
| 5,475,746 | 12/1995 | Miller et al. | 379/201 |
| 5,483,585 | 1/1996 | Parker et al. | 379/201 |
| 5,485,511 | 1/1996 | Iglehart et al. | 379/201 |
| 5,488,569 | 1/1996 | Keplan et al. | 379/201 X |
| 5,533,109 | 7/1996 | Baker | 379/201 |
| 5,537,466 | 7/1996 | Taylor et al. | 379/201 |
| 5,555,288 | 9/1996 | Wilson et al. | 379/67 |
| 5,577,041 | 11/1996 | Sharma et al. | 379/93.11 X |
| 5,621,727 | 4/1997 | Vaudreuil | 379/225 X |
| 5,657,376 | 8/1997 | Espent et al. | 379/89 |

OTHER PUBLICATIONS

"Ace*Comm, An ISO 9001 Registered Company", No. N96–1377 Date: unknown.

55 pages from Internet website http://www.nclogic.com/ relating to NEC AIMWorX System Copyright 1997–1998.

Marketing brochure by 2nd Nature Unimax Systems Corporation, Jun. and Jul., 1996 news releases.

Marketing brochure by Switchview, ©1996.

Northern Telecom bulletin dated Jan., 1996, "Announcing Meridian Administration Tools Release 3".

Northern Telecom bulletin dated Jan., 1995, "Meridian Administration Tools (MAT) Release 2", pp. 1–22.

Northern Telecom product description dated Jan., 1995, "Meridian Administration Tools (MAT)", pp. 1–8.

FIG.4
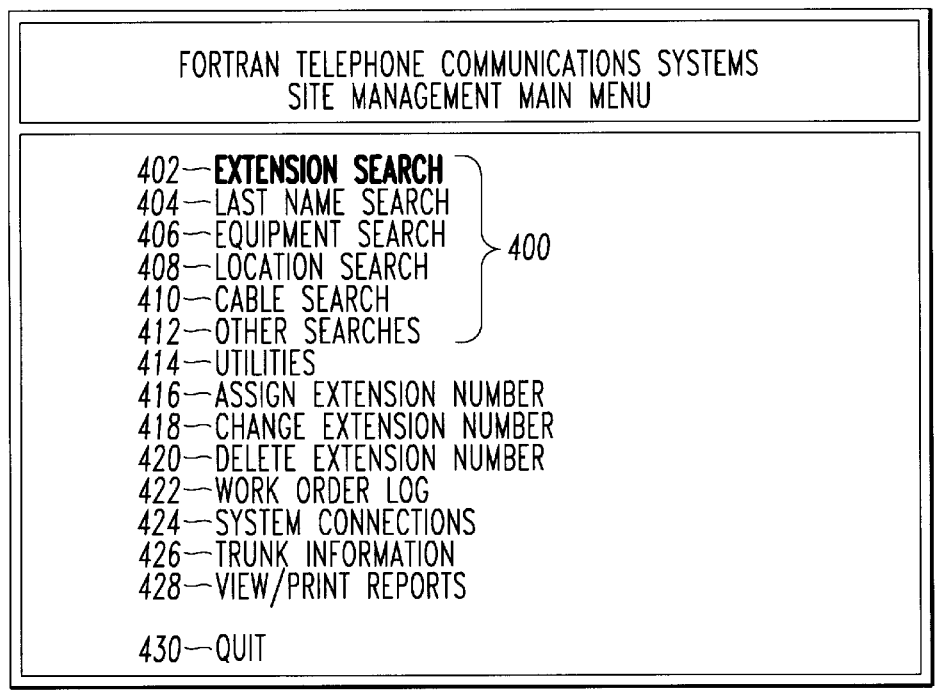
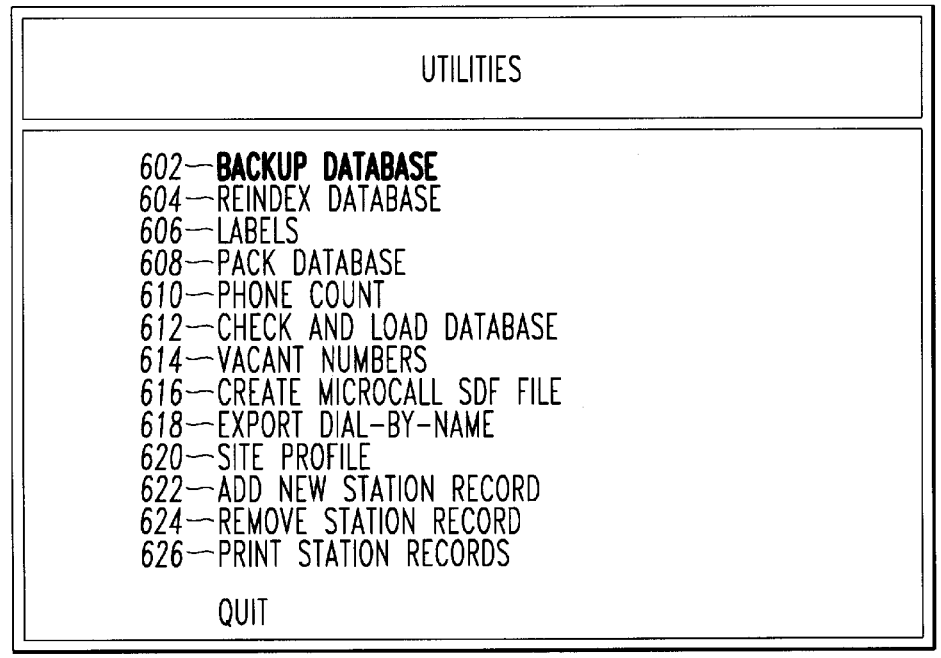
FIG.6

EXTENSION: 1221  LOCATION: OPS-11
NAME: SUGAR, DAVID  DEPARTMENT: OPERATIONS  EQUIPMENT: 00001020
PUBLISHED: (703) 492-1221  TOLL CLASS: D  COS: 1  PHONETYPE: D124DS
SERIAL#:  PICKUP GROUP: 1255  MAILBOX: 1221  ASSIST: 1268
BL 5420  NA 5420  AC  DND 5420  INTERCOM
CABLE NO: 106  HOUSE PAIR  MDF PAIR
DATA EXT

[UPLOAD REQUIRED] — 502

504

| F1 | F2 | F3 | F4 | F5 | F6 | F7 | F8 | F9 | F10 |
|---|---|---|---|---|---|---|---|---|---|
| SCAN | EDIT | WORK ORDERS | UPLOAD EXT | DESI | DELETE RECORD | FILTER BUILDING | PRINT | TTY | CMD |

TELECOMMUNICATIONS INSTALLATION AND MANAGEMENT SYSTEM AND METHOD

This disclosure includes a microfiche appendix of 358 frames on 4 fiches, which is copyright © 1991–1996, Brian E. Stowers and Lawrence F. Glaser and copyright © 1994–1996, Fortran Telephone Communication Systems, Inc. The copyright owners have no objection to the facsimile reproduction by anyone of the patent disclosure, as it appears in the Patent and Trademark Office patent files or records, but otherwise reserve all copyright rights whatsoever.

FIELD OF THE INVENTION

The present invention generally relates to a system and method of managing and controlling electronic equipment having a plurality of programmable parameters and more particularly relates to a system and method for managing, controlling, updating and monitoring one or more telecommunications switches, such as private branch exchange telephone switches, central offices and their associated peripheral telecommunications equipment.

BACKGROUND OF THE PRESENT INVENTION

The ability to quickly, easily and efficiently communicate has always been a critical component, if not a necessity, for successful business operations. Today, as the global economy continues to expand, the ability to communicate is even more important. In partial response to these demands, sophisticated telecommunications equipment has been developed that permits users to quickly and easily place, receive, transfer and switch telephone calls as well as provide advanced features such as call accounting and voice messaging functionality. As these features have become widely available in local telecommunications equipment, such as private branch exchange (PBX) telephone switches, central offices, key and hybrid telephone systems (small telecommunications switches), call accounting systems, voice messaging systems, computer telephony interface (CTI) devices, automatic call distribution (ACD) devices, internet servers, etc., the demand for and installation of these systems has continued to expand. Often, a vast number of sites have layered or "integrated" two or more of the aforementioned devices and rarely are these different devices using the same operating system or of the same brand. More often, these differing devices include a mixture of operating systems and brands.

Such a mix of advanced telecommunications equipment, however, still typically relies upon a significant amount of manual human interaction to install, setup, operate, modify and maintain. Specifically, when a new telephone switch such as a PBX is to be installed at a facility, not only must the physical equipment itself be installed, but the equipment must be configured and programmed to operate as desired by the users of the facility. In fact, as more and more advanced features have become available in the equipment, the burden on the equipment installer to initially setup and configure these features for the specific needs of the end user and the burden on the technician in maintaining and modifying the equipment, the associated cable records for the equipment, and cable and service activities, has also increased.

When a telephone switch is accompanied by other telecommunications equipment, such as voice messaging systems, call accounting systems, CTI devices, wireless communication servers, or ACD devices, installation inconveniences are still further multiplied. Specifically, many of these ancillary pieces of equipment require additional entry of user information that is duplicative of information already entered into the main telephone switching equipment. In such case, not only must a technician program the main telecommunications switch, but additional time (and money) must be spent for programming ancillary equipment with similar information. Typically, these systems must be perfectly synchronized with each other or problems will occur. As a result, the total cost of the installation is greatly increased and data entry error rates are greatly increased.

To further complicate the installation and management of this equipment, each discrete change to one component of a telecommunications system often requires additional, similar changes to several other components. Furthermore, these additional changes typically must be done in a specific order and, since the operating system design of each of the telecommunications devices often changes from manufacturer to manufacturer and from device to device, by using an entirely different command structure for each different component. Therefore, when done manually, a technician must remember different command structures for each of the devices that require programming and also must remember the order in which the changes should be made and further may require different terminals, passwords, procedures, software, etc. Thus, a highly skilled technician having familiarity with all of the various types of equipment that make up the telecommunications system must perform these changes, or as is more common, multiple technicians are required. Clearly, with even a limited number of devices that require installation, maintenance, or programming, the likelihood of an error is greatly increased.

Since modern telecommunications equipment provides substantial flexibility in programming to accommodate varying preferences of different users, it is often necessary to begin the installation of such equipment by surveying users as to their desires and preferences so that these can be accurately reflected through programming of the equipment. This is typically done by distributing a questionnaire to each user to receive information sufficient to allow the equipment to be properly configured. Thus, not only is there a substantial time commitment needed to review and enter the information received on such questionnaires into the equipment, but significant effort on the part of each and every user is also required to complete the questionnaires. Typically, collection of this data and entry of it must wait until the system is installed, while in the present invention described below, this information can be stored externally, checked for omissions, checked for errors or duplications and processed months in advance.

Such disadvantages are particularly highlighted when an outdated PBX or central office system is replaced with an improved system. In such case each user is typically surveyed as to their preferences, as above, and this information is manually re-entered after installation of the improved PBX or central office system. Thus, since equipment upgrades impact each and every user in a facility, a significant devotion of resources is required. As a result, the benefits of advanced features provided by improved telecommunications equipment often does not outweigh the installation costs and thus many organizations either do not upgrade their equipment, or delay such upgrades as long as possible.

Large organizations are also often confronted with the need to augment existing PBX systems with newer versions of the same brand of equipment or equipment manufactured by a different manufacturer. Such organizations are then confronted with a host of difficult installation, operation, coordination and maintenance problems associated with managing disparate systems having different capabilities, operating characteristics and command protocols.

Furthermore, post-installation maintenance of such telecommunications switching equipment often requires intervention of a skilled technician. For example, adding new users to the system requires that information sufficient to identify the user, her equipment and her preferences be programmed into the system. Often, this programming must be performed by a technician, who must make a service call to the facility to complete such programming. Also, management of detailed records documenting the telecommunications system setup must be manually kept for each device. That is, cable numbers, user identification and preferences, equipment types and locations, etc. must all be maintained separately from the system itself. Again, as a result, the costs involved in maintaining the telecommunications system is greatly increased.

Typically, programming of a telecommunications switch such as a PBX is performed by entering a series of special codes into a designated telephone handset connected to the PBX. Thus, by using the keypad and any display capabilities of the telephone, programming information can be entered into the PBX system. While such a system has the advantage of not requiring additional support equipment, such an interface is not user friendly and thus is extremely difficult for untrained personnel to use. In addition, even a skilled technician is limited in that each item to be programmed must be repetitively entered for each user on the system. Thus, for each station connected to the system, the technician must enter a complex series of digits that identify a parameter to be set and the appropriate data for that parameter. For systems having hundreds or thousands of stations, this process is not only extremely time consuming but is also prone to significant data entry errors.

While several attempts have been made to overcome one or more of the above deficiencies, none have succeeded in providing a telecommunications installation and management system that substantially reduces the amount of manual human interaction required to install and maintain telecommunications equipment. For example, a number of manufacturers have developed so called "dumb" terminals that interface with a PBX telephone switch to facilitate programming thereof. These dumb terminals (or a PC emulating a dumb terminal) generally do not contain any processing capability, but rather act to display data stored within a memory in the PBX switch and to receive and forward user input to the switch. Thus, for example, the current operating parameters for a given telephone station can be requested from the switch, displayed on the terminal and modifications received from a user can be returned and stored in the telephone switch memory. In fact, to a technician skilled in programming a switch, the enhanced personal computer interface of TTY interface is no more efficient than a dumb terminal or programming via a telephone station. The present invention, however, overcomes these deficiencies.

Implementations of such systems, however, typically respond slowly to user requests for data due to the relatively slow speed of data communication between the terminal and the switch, internal latency of the switch and upon encountering a busy condition. Thus, when information for a given telephone station is requested, that information must be accessed by the telephone switch and transferred through a communications link to the terminal for display thereon. Similarly, further delays result due to the need to immediately upload any modified data to the switch. Thus, practically, these systems have significant "lag" in responding to user requests. As result, while these systems may simplify the complexities of the programming process, they do little to actually accelerate that process.

Specifically, power to search for duplicate entries, perform logical sorts, generate custom reports and provide other advanced features is virtually always lacking. Therefore, in order to check data or search for a problem, either each record must be manually pulled up and reviewed one at a time, or a complete mass listing must be printed and checked manually.

Furthermore, these management systems are often proprietary and inflexible in that they can operate with only a single brand or type of telecommunications equipment, and furthermore can only be physically connected to a single component of the telecommunications system at a time. Thus, these systems fail to provide for real-time modification of operational parameters for one or more devices having differing command structures that are integrated into a single telecommunications system or network.

As an alternative to the above solution, Northern Telecom has developed a system called Meridian Manager™, which includes a personal computer and associated software that facilitates switched connection control of one or more Meridian 1 PBXs. The Meridian Manager™ system includes a local database within the personal computer that stores a mirror image of some of the information stored within the Meridian 1 PBX primarily dealing with button assignments for telephones. Thus, when some of the information in the PBX is to be changed, the change can be made in the local database and subsequently downloaded to the PBX at a desired time. In this manner, the "lag" associated with retrieving and displaying the information programmed in the PBX is reduced. Again, however, a skilled technician is unable to gain any efficiency with such systems and thus is unable to reduce the time or costs associated with program changes of these devices.

A similar system, called Switchview by Switchview, Inc. includes software that facilitates switched connection control of one or more Meridian 1 PBXs. Like the Meridian Manager™ system, the Switchview system includes a local database within a computer that stores information used to control the operation of the Meridian 1 PBX. Like Meridian Manager™, however, the Switchview system fails to provide a real-time interconnection with multiple telecommunications devices having differing operating command structures and operating systems to allow for management and control of such devices.

In addition to the above devices, several additional devices have been developed to provide a less complex user interface to facilitate programming of telecommunications equipment. For example, U.S. Pat. No. 5,309,509 to Cocklin et al. discloses a workstation having a graphical user interface for use with a manager controller to control and implement changes to telephone sets of a telephone system. The workstation enables the customer to selectively enter telephone lines, features and directory number changes into key button locations of a displayed telephone. These changes are converted into program instructions and transmitted to the manager controller to control the telephone switching system to assign the selected lines, features and directory numbers to the telephone set. The reference, however, is directed to updating information stored at a telephone company switching office rather than at a local private branch exchange, and fails to disclose a system in which an external computer connected with PBX equipment is used for programming the PBX equipment to integrate, manage and support a plurality of different telecommunications products having diverse command structures. In addition, the reference does not disclose a system that includes the capability to integrate multiple telephone switches, brands, networks, subsystems, peripherals and software.

U.S. Pat. No. 4,928,304 to Sakai discloses an electronic switching system that includes a PBX connected with an external computer. Programs for standard switching functions are stored in the PBX, while programs that apply only to a portion of the telephone terminals (called service functions) are stored in the external computer. Alteration of the service functions is accomplished by altering the programs in the external computer, thus avoiding the need to alter programs in the PBX. The reference, however, again fails to disclose a system in which an external computer connected with PBX equipment is used for programming the PBX equipment to integrate, manage and support a plurality of different telecommunications products, or that includes the capability to integrate multiple telephone switches, networks, subsystems, peripherals and software.

SUMMARY OF THE INVENTION

In view of the above disadvantages it is a primary object of the present invention to provide a novel telecommunications installation and management system and method for installing and managing a telecommunications switch, such as a PBX telephone switch, that overcomes the disadvantages discussed above.

It is a further object of the present invention to provide a telecommunications installation and management system for a telecommunications system that includes software that is operable on a wide variety of computing platforms, including a personal computer or personal computer network (LAN/WAN/Internet/Intranet, etc.)

It is yet another object of the present invention to provide a telecommunications installation and management system that includes one or more personal computers and associated software interconnected with a telecommunications system for transference of operational data therebetween.

It is a still further object of the present invention to provide an interface device for use between a telecommunications installation and management system and a telecommunications system that is capable of simultaneous or near simultaneous communication with a plurality of differing telecommunications components forming the telecommunications system.

It is another object of the present invention to provide a telecommunications installation and management system and method that is capable of interfacing to, and communicating with, a plurality of different makes, models or types of telecommunication system components, such as PBX telephone switches.

It is a further object of the present invention to provide a telecommunications installation and management system and method that is capable of interfacing to, and communicating with, one or more of a PBX telephone switch, a call accounting system, a voice messaging system, a CTI device, an ACD device, or another peripheral device.

It is yet a further object of the present invention to provide a telecommunications installation and management system and method that is capable of interfacing to, and communicating with, one or more telecommunications system components, such as PBX switches or central office switches that employ different data formatting protocols.

It is a still further object of the present invention to provide a telecommunications installation and management system and method that is capable of interfacing to, and communicating with, one or more PBX telecommunications system components, such as telephone switches that employ different internal operating systems.

It is another object of the present invention to provide a telephone switch management system that is capable of communicating using a variety of different data formats and protocols depending on the make and model of a telephone component or switch with which communication is desired.

It is also an object of the present invention to provide a telecommunications installation and management system for telecommunications equipment, such as a PBX telephone switch, in which a plurality of reprogrammable parameters stored within the telecommunications equipment are also stored within a local database contained within the installation and management system.

It is another object of the present invention to provide a telecommunications installation and management system and method that reduces or eliminates time delays experienced by a user in adding, updating or modifying operational parameters of telecommunications equipment, such as a PBX telephone switch.

It is a still further object of the present invention to provide an installation and management system for telecommunications equipment, such as a PBX telephone switch, in which user updates or modifications of reprogrammable parameters used to control the operation of the telecommunications equipment are made in a local database stored within the installation and management system, thus greatly reducing or eliminating time delays experienced by the user in performing such updates or modifications.

It is yet another object of the present invention to provide a telecommunications system management system and method that facilitates documenting and maintaining a telecommunications system including performing cable records management, managing patch panel configurations, tracking of trouble reports, printing and tracking service orders, managing project milestones, due dates, etc., and printing of overlay labels and other documentation for the telecommunications system.

It is a further object of the present invention to provide a telecommunications installation and management system that permits users to make updates or modifications to reprogrammable parameters used to control the operation of telecommunications equipment, such as a PBX telephone switch, without such changes becoming automatically or manually effective until a later time determined by the user.

It is yet another object of the present invention to provide a telecommunications installation and management system in which desired changes or updates to operational parameters of a telecommunications system received from users of the system and are received and stored externally, checked for omissions, checked for errors or duplications and processed prior to downloading to the telecommunications system.

It is a further object of the present invention to provide a telecommunications installation and management system that permits users to automatically or manually initiate updates or modifications to reprogrammable parameters used to control the operation of telecommunications equipment, such as a PBX telephone switch, in response to an emergency situation.

It is an additional object of the present invention to provide a telecommunications installation and management system in which user updates or modifications of reprogrammable parameters used to control the operation of telecommunications equipment, such as a PBX telephone switch, are retained in a local database and uploaded to the telecommunications equipment at a later predetermined time.

It is still a further object of the present invention to provide a telecommunications installation and management system that generates a log confirming receipt and acceptance by a telecommunications system of user updates or modifications of reprogrammable parameters used to control the operation of the telecommunications system.

It is another object of the present invention to provide a telecommunications installation and management system that maintains a backup of critical operational data necessary to the operation of the telecommunications system.

It is yet another object of the present invention to provide a telecommunications installation and management system that allows a system operator to create a duplicate copy of control information for a telecommunications system, network or peripheral device, to modify that information offline, and to perform a mass download of that information to the telecommunications system at a predetermined time.

It is another object of the present invention to provide a telecommunications installation and management system and method that automatically updates or modifies one or more operational parameters used to control the operation of telecommunications equipment, such as a PBX telephone switch, in response to a command from a user to add, update, delete or modify another of such operational parameters.

It is a further object of the present invention to provide a telecommunications installation and management system for a telecommunications system in which a plurality of duplicative reprogrammable parameters stored within the telecommunications system need only be stored once within a local database contained within the installation and management system.

It is a still further object of the present invention to provide a telecommunications installation and management system for a telecommunications system in which at least one reprogrammable parameter is retrieved from a local database contained within the installation and management system and is formatted for transmission to the telecommunications system depending on the capabilities of the telecommunications system.

It is yet another object of the present invention to provide a telecommunications installation and management system for a telecommunications system in which a reprogrammable parameter is retrieved from a local database contained within the installation and management system and is converted into one or more different formats suitable for storage and use in one or more different telecommunications devices forming the telecommunications system.

It is yet a further object of the present invention to provide a telecommunications installation and management system that expedites upgrading, expansion, contraction or deliberate downsizing with automatic relocation of displaced components of telecommunications equipment by storing data that represents what components are where, what are the subcomponents of each device, what changes can be made based on present inventory, and what program changes are necessary in view of these changes.

It is another object of the present invention to provide a telecommunications installation and management system that tracks inventory including internal components and their precise placement within each telecommunications device to permit automatic determination of parameters and configuration in response to a user request, for example, moving of certain telephone stations.

It is a still further object of the present invention to provide a telecommunications installation and management system capable of downloading programming information from an installed piece of telecommunications equipment, translating such programming information into a format suitable for a replacement for such piece of equipment and uploading the translated information to the replacement equipment.

It is another object of the present invention to provide an installation and management system for a telecommunications system that includes the capability to perform some or all of the tasks typically performed by discrete telecommunications devices, thus reducing or eliminating the required number of discrete telecommunications devices and providing further flexibility to the telecommunications system.

It is a further object of the present invention to provide a telecommunications installation and management system for a telecommunications system that includes an interface device used to facilitate transfer of information from the installation and management system to the telecommunications system.

It is yet another object of the present invention to provide a telecommunications installation and management system in which communication paths to a plurality of managed subsystems are duplicated in order to provide redundant communications capability and in which a communications failure is automatically detected and a secondary communications link is used.

It is yet another object of the present invention to provide a telecommunications installation and management system that reduces or eliminates duplicate data entry when installing or maintaining telecommunications equipment.

It is yet another object of the present invention to provide for all of the aforementioned for other telecommunications devices, such as, for example, a router, hub or bridge, where the telecommunications device offers a communications path suitable for management of the device and the device contains data that can desirably be managed or manipulated.

These and other objects of the invention which will be apparent on reviewing the specification and microfiche appendix can be achieved using the improved telecommunications installation and management system and method disclosed herein that automates the installation and maintenance of a telephone switch and associated ancillary equipment. The present invention provides a telecommunications system installation and management device and method that includes a common, user friendly interface for managing, controlling, updating and monitoring a telecommunications switch, such as a private branch exchange telephone switch and associated (or disassociated) peripheral telecommunications equipment. The device is capable of managing and controlling a plurality of different types of telecommunications equipment, such as telephone switches, call accounting systems and voice messaging systems, provided by various different manufacturers and having differing command protocols and/or operating systems to thereby seamlessly integrate the equipment into an easily managed telecommunications system. A local database within the telecommunications system provides for near real-time access and modification of programming information for the telecommunications equipment and further provides for redundancy in the event that the telecommunications equipment should fail. In addition, real-time or near real-time interconnection with all managed subsystems is provided to facilitate immediate update of operational parameters in response to user requests.

BRIEF DESCRIPTION OF THE DRAWINGS

FIG. 4 illustrates a preferred layout for a main menu of a computer programmed in accordance with the present invention.

FIG. 5 illustrates a typical record stored within a database of a computer programmed in accordance with the present invention.

FIG. 6 illustrates a preferred layout for a Utilities submenu of a computer programmed in accordance with the present invention.

DETAILED DESCRIPTION OF THE PREFERRED EMBODIMENT

Figure 1:
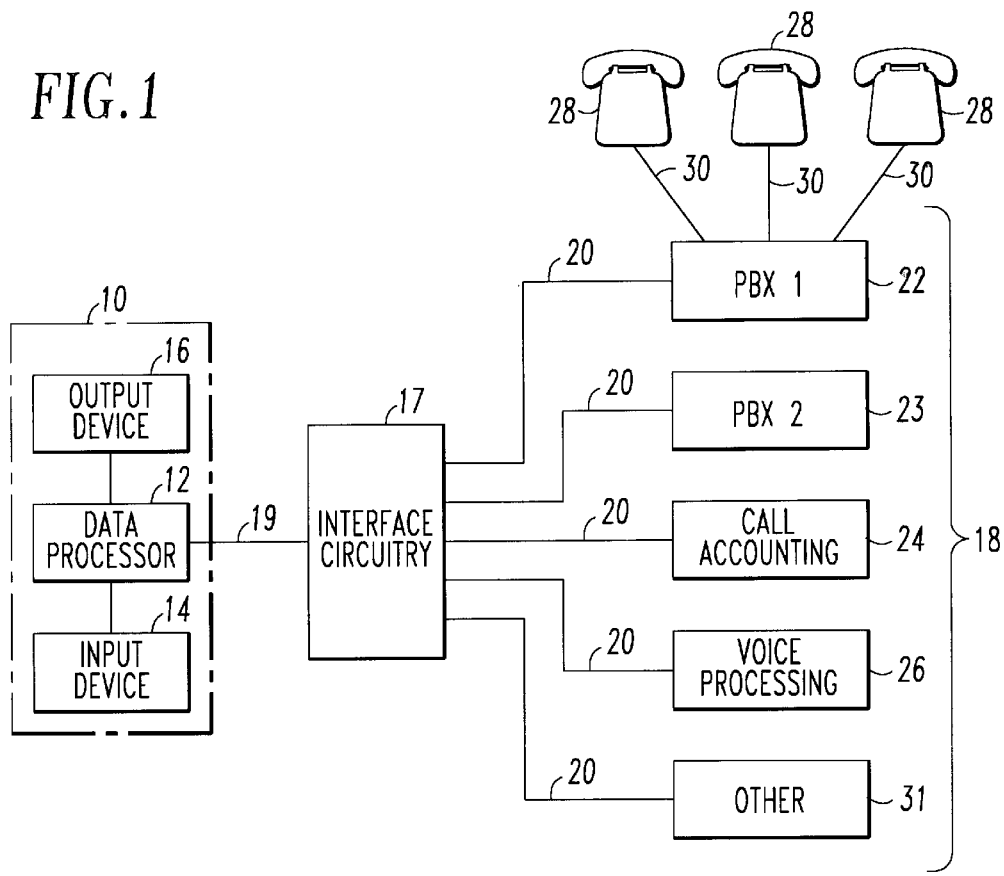
FIG. 1 illustrates a schematic block diagram of the present invention and the interconnection between a computer system programmed in accordance with the present invention and one or more telecommunications subsystems.

Documented source code for a preferred embodiment of the operational software used in the present invention is provided in the microfiche appendix that is part of this specification. Upon reviewing the source code for the operational software in the microfiche appendix, in conjunction with the description and drawing figures in the main part of the specification, those skilled in the art will fully understand the features and operating characteristics of the present invention.

As described in detail below, one preferred embodiment of the present invention includes a computer system, such as a personal computer, connected with a telecommunications system through a communication path. The personal computer system includes operational software, a preferred embodiment of which is included in the microfiche appendix.

The source code in the microfiche appendix includes twenty-three files twenty files having a ".prg" extension and three files having a ".fmt" extension. Generally, the ".prg" files are program files that, in this preferred embodiment, conform to the Borland, DBase V programming language. The ".fmt" files, including TRUNKS.FMT, PROFILE.FMT and REPAIRS.FMT are screen entry format files that are used to determine the format of information to be received from a user. The functions of the specific programs are discussed below.

The SITE.PRG program contains the main application code of the present invention. SITE.PRG handles the display of menus and database records for user information. SITE.PRG further contains low-level communication services and supporting functions as well as the subroutines for generating reports, work order processing, entry and editing of database fields, look-up and data validation functions and rules. SITE.PRG uses several ".fmt" files for site specific or generic data entry screens as required. Other subroutine calls include calls to external programs that control the various aspects of communications and relationships with managed subsystems such as a specific brand of PBX or voice-processing system.

The F9600.PRG file contains the communication routines that are specific to issuing programming changes in the Fujitsu F9600 PBX series. Also contained are utilities that allow the present invention to synchronize and automatically populate its local database tables with information contained within a Fujitsu PBX or to conversely program the Fujitsu PBX as a single operation from information contained within the internal database of the present invention. This module accounts for the many nuances and sequences that must normally be performed manually for operations such as adding or deleting telephones (or other native devices) for the Fujitsu PBX. This program also contains additional functionality for interfacing with the Fujitsu PBX including an interpreter of the Fujitsu F9600 EMML programming templates to allow native programming of the PBX without using a separate maintenance terminal. As changes are made in the local database of the present invention to fields representing User Names, Key Buttons Assignments, Feature Class, Call Forwarding, Pickup Groups etc., this module processes the requests to the F9600 PBX and verifies the changes by querying the F9600 PBX in a follow-up error check.

Importantly, the preferred embodiment of the present invention as embodied by the source code in the microfiche appendix is intended to operate with a Fujitsu F9600 type PBX. Of course, one of skill in the art will appreciate from the discussions herein and the source code in the appendix that the present invention could be adapted to operate with any desired PBX or other telecommunications equipment through the provision of a suitable program similar to the F9600.PRG program. Furthermore, non-telecommunications equipment, such as routers, hubs, and bridges, can be managed through the replacement of the F9600.PRG program with another program for interfacing with the non-telecommunications equipment. Thus, where it is desired to use the present invention with other telecommunications or non-telecommunications systems, the F9600.PRG program would be replaced with another suitable program for interfacing with the desired equipment. For example, where an AT&T PBX telephone switch is to be managed, the F9600.PRG could be replaced with a program that employs the same novel and unique techniques, logical assumptions and relationships to control the AT&T PBX telephone switch. Furthermore, where multiple devices are to be managed, multiple device specific control programs, such as the F9600.PRG program, could be operated at the same time in accordance with the present invention.

The EXPORT.PRG program is used to export directory names for Fujitsu dial-by-name servers and external directory systems (such as the IBM mainframe Personal Records Management System) which need to be synchronized to the master directory held in the internal database of the present invention.

The CENTIGRA.PRG program contains communication routines that are specific to issuing programming instructions to the Centigram Series of voice processing systems. Also contained are utilities that allow the present invention to synchronize and automatically populate its database tables with information contained within a Centigram voice processing system or to conversely program the Centigram voice processing system in a single operation from information contained within database tables of the present invention. This module accounts for the many nuances and sequences that must normally be performed manually for operations such as adding or deleting mailboxes from the Centigram system. As changes are made in the local database of the present invention to User Names, Department, Operator Extension Number, Feature Class, etc., this module processes the requests to the Centigram voice processing system and verifies the changes by querying the Centigram system in a follow-up error check. Similarly, the OCTEL-.PRG program contains the communication routines that are specific to issuing programming instructions to the OCTEL series of voice processing systems and for performing the other ancillary functions discussed above in connection with the CENTIGRA.PRG program.

The CHECK.PRG program contains routines used to validate data integrity and validity in the internal database globally, usually before programming a new telecommunications device, such as a telephone switch, voice processing system, etc. This program also contains routines used to create and upload operational parameters for a new PBX system from scratch. The ASSAC.PRG, ASSDICL.PRG, ASSVL.PRG, ASSMLDT.PRG, ASSPICL.PRG, ASSSLT.PRG, and ASSICLG.PRG programs contain the routines used by the CHECK.PRG program to generate Fujitsu F9600commands for building/loading an F9600 PBX from a completed local database within the present invention.

The SETUP.PRG program is used to configure the present invention during an initial setup phase. This program allows selection of defaults such as dialing plan and other operational nuances, and then builds an initial local database for use in the present invention.

The REP.PRG, REP1 .PRG, and REP2.PRG programs provides generic report support and generation in the present invention. These programs allow the present invention to create ad-hoc queries and reports that may be browsed on-screen, printed, or saved to disk for export to other systems.

The DESI9600.PRG program contains the routines for reading telephone related data contained within the present invention and printing it on pre-printed facemat designation labels as one seamless operation. As key-button assignments are re-programmed on a digital telephone, this program prints a newly updated label with additional instructions such as Name, Location, Department and other pertinent information that is needed to maintain current desktop information. The program automatically adjusts and prints Direct Inward Dial prefixes and other site specific rule based information on the facemats.

Finally, the BACKUP.PRG program contains support for backup and archiving of the local database of the present invention and the PROJECT.PRG program provides support for basic project management functionality in connection with the management and support functions of the present invention.

Referring first to FIG. 1, a schematic block diagram of the present invention and the interconnection between a computer system programmed in accordance with the present invention and one or more managed telecommunications subsystems is shown. As can be seen in FIG. 1, the present invention comprises a telecommunications installation and management system 10 that typically includes a personal computer data processing portion 12 having an input device 14, such as a keyboard and/or mouse, and an output device 16, such as a video display terminal. As shown in FIG. 1, data processing portion 12 is connected with input device 14 for receiving input therefrom and is further connected with output device 16 for displaying information to a user of the system 10. While system 10 is preferably implemented using a personal computer, any computer capable of performing the functions described below could be used in accordance with the present invention. Furthermore, where input device 14 is preferably a keyboard or mouse and output device 16 is preferably a video display terminal, any suitable input and output devices could be used including touch screens, light pens, read/write compact disks, etc.

Telecommunications installation and management system 10 is connected with one or more managed telecommunications subsystems shown generally at 18 through interface circuitry 17. Specifically, system 10 is connected by communication path 19 to interface circuitry 17 and interface circuitry 17 is connected by communication paths 20 to one or more of a first Private Branch Exchange (PBX) telephone switch 22, a second PBX telephone switch 23, a call accounting system 24 and a voice processing system 26, such as a voicemail system and any other device 31 such as a router, hub, bridge, etc. User terminals, such as telephone stations, can be connected to telecommunications subsystems 18 as required. For example, telephone stations 28 can be connected to PBX telephone switch 22 through a plurality of suitable connections 30.

As illustrated in FIG. 1, interface circuitry 17 serves to receive information from the system 10 through communication path 19 and to forward that information to an appropriate telecommunications subsystem 18 through one of communication paths 20, as well as to receive information from telecommunications subsystems 18 through communication paths 20 and to forward that information to system 10 through communication path 19. In one preferred embodiment, interface circuitry 17 is a code operated switch, that operates to receive information from system 10 through communication path 19 and to process that information to generate appropriate selected data for output to each of the telecommunications subsystems 18. This selected data is then transmitted through communications paths 20 from interface circuitry 17 to each of the telecommunications subsystems, as appropriate. As described in more detail below, the code operated switch provides for bi-directional communication between a plurality of devices, such as the system 10 and the telecommunications subsystems 18 in the present invention.

While interface circuitry 17 could include a single code operated switch, such a configuration would limit the number of telecommunications subsystems that could be supported by the present invention to the number of available outputs on the single code operated switch. Thus, in accordance with another preferred embodiment of the present invention, multiple code operated switches are connected or cascaded together to allow for connection of additional telecommunications subsystems 18.

Figure 2:
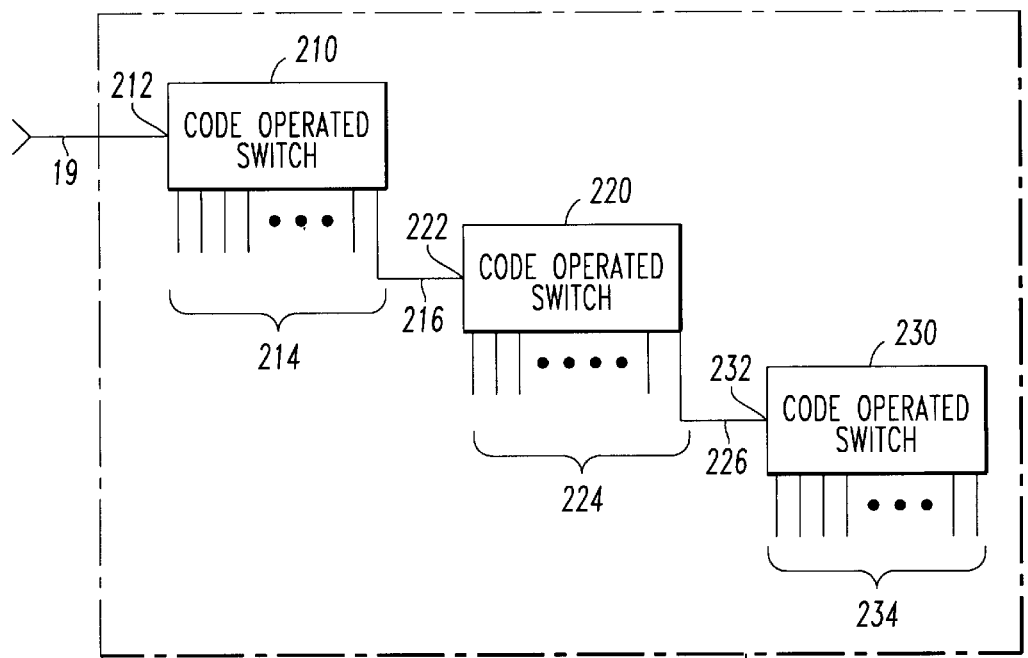
FIG. 2 illustrates a preferred embodiment of the present invention wherein multiple code operated switches are connected or cascaded together to provide interconnection between a computer system programmed in accordance with the present invention and one or more managed telecommunications subsystems.

FIG. 2 illustrates one such configuration. As seen in the example of FIG. 2, three code operated switches are daisy-chained together to increase the number of managed subsystems that can be controlled by the present invention. Specifically, as seen in FIG. 2, interface circuitry 17 includes a first code operated switch 210, a second code operated switch 220 and a third code operated switch 230. Each switch 210, 220, 230 includes an input 212, 222 and 232, respectively, and a plurality of outputs (such as, for example, 64 outputs) designated generally at 214, 224 and 234, respectively. One output 216 from first code operated switch 210 is connected to input 222 of the second code operated switch 220. Similarly, one output 226 of the second code operated switch 220 is connected to input 232 of the third code operated switch 230. In this manner, the three code operated switches 210, 220 and 230 are daisy-chained together.

Each of the three code operated switches in this configuration provides for bi-directional communication between the inputs and outputs of each switch. Thus, data provided on communication path 19 to input 212 of first code operated switch 210 will be transferred to one of the outputs 214. Which output the data will be transferred to is controlled by command parameters passed with the data to input 212. Thus, each one of outputs 214, except output 216 that is connected to input 222 of the second code operated switch 220, can be connected to managed subsystems to be controlled by the present invention, such as telecommunications subsystems 18. Similarly, each one of outputs 224, except output 226 that is connected to input 232 of the third code operated switch 230, can also be connected to managed subsystems to be controlled by the present invention. Since the embodiment shown in FIG. 2 only includes three code operated switches cascaded together, all outputs 234 of the third code operated switch 230 can be connected to additional managed subsystems. Of course, if additional outputs are required, additional code operated switches could be cascaded to third code operated switch 230 as needed depending on the number of subsystems to be managed by the present invention.

As known to those of skill in the art, information received at input 212 of first code operated switch 210 is bifurcated into a series of discrete data packets for transmission to each of the outputs 214. The division of the input data is controlled through the provision of commands embedded in, or transferred with, the input data. Thus, when multiple code operated switches are connected together as shown in FIG. 2, relatively short data packets intended for directed transmission to subsystems are provided at all outputs 214 other than output 216, which is connected to input 222 of the second code operated switch 220. The data packet transferred to output 216 is a concatenation of a plurality of data packets and control information that is further bifurcated as required to be provided to outputs 224 of the second code operated switch 220. A similar approach is used to transfer information to outputs of the third (or fourth, etc. where more than three switches are used) code operated switch 230.

Referring again to FIG. 1, communications paths 19 and 20 may be any suitable connection for transferring information between the system 10 and interface circuitry 17, and between interface circuitry 17 and telecommunications subsystems 18. In one preferred embodiment of the present invention, communications paths 19 and 20 include RS-232 serial cables connected between corresponding data ports on the system 10 and the interface circuitry 17 and between interface circuitry 17 and telecommunications subsystems 18. In another preferred embodiment, communications paths 20 comprise a standard telephone connection used to transfer data, such as a dial-up modem connection. Of course, any suitable connection can be used for communications paths 19 and 20 provided that information may be exchanged therethrough. Thus, an ISDN link, dial-up or dedicated modem link, a direct serial or parallel link, a wireless data link (including AM, FM, digital, or any other suitable modulation scheme), a packet-switched network, an internet interconnection, or any similar or equivalent connection can advantageously be used with the present invention.

As discussed above, in one preferred embodiment of the present invention, interface circuitry 17 is one or more code operated switches. In an alternative preferred embodiment, interface circuitry 17 includes a local or wide area computer network, such as an ethernet network, token ring network, FDDI (fiber distributed data interface), CDDI (copper distributed data interface), ATM (asynchronous transfer mode) network, etc. In such a system, each of the telecommunications subsystems 18 would be connected to the network through suitable network interface circuitry, or NIC. Also, any hybrid of the aforementioned could be used, such as, for example, one code operated switch, one modem, three RS-232 serial interconnections, one FDDI, one NIC, one BRI ISDN interconnection, and one Internet interconnection. In addition, where it is impossible or undesirable to directly connect one or more of telecommunications subsystems 18 to the network infrastructure, a communications server can be used to facilitate communication with these peripherals. Specifically, a communications server, such as a personal computer, would be connected to the network through suitable network interface circuitry and would communicate with the peripherals through a serial or other suitable data link.

Figure 3:
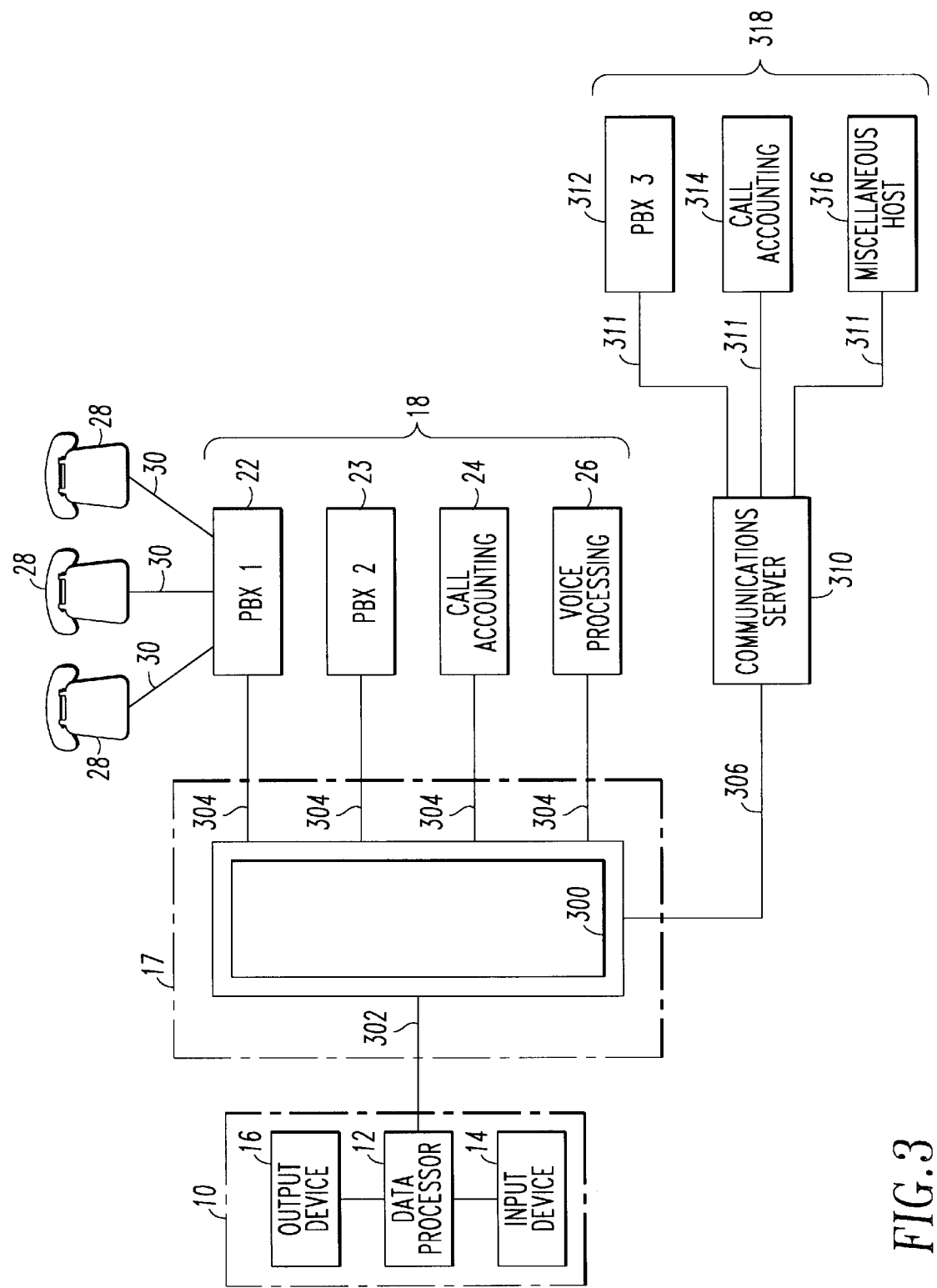
FIG. 3 illustrates an alternative preferred embodiment of the present invention that includes a local or wide area computer network to interconnect a computer system programmed in accordance with the present invention and one or more managed telecommunications subsystems.

FIG. 3 illustrates this preferred embodiment of the present invention, where like references numerals from FIG. 1 are used for like components. As seen in FIG. 3, interface circuitry 17 includes a local or wide area network 300. Communications paths 19 and 20 have been replaced with network interface circuitry 302 and 304 respectively, which could include a network interface circuit card and associated cable to connect that card to the network 300. In the embodiment shown in FIG. 3, telecommunications subsystems 18 interface directly to network 300 through network interface circuitry 304. Therefore, telecommunications subsystems 18 must be capable of connecting with network interface circuitry 304. In the most preferred embodiment, each of telecommunications subsystems 18 has a computer interface slot for receiving a standard network interface card that forms a portion of network interface circuitry 304.

In the event that telecommunications subsystems cannot be directly connected to network 300, they may still be controlled in the embodiment of FIG. 3 through another data communications interface, such as a serial data communications port. This is accomplished through the use of a communications server 310. As shown in FIG. 3, communications server 310 is connected to network 300 through suitable network interface circuitry 306, which in a preferred embodiment is similar to circuitry 304 and includes a network interface card and associated cable. Communications server 310 could be, for example a personal computing system with associated communications software and circuitry 306 could be a network interface card, such as an ethernet network interface card and interconnecting cable.

Communications server 310 is connected with one or more telecommunications subsystems shown generally at 318 through communications paths 311. Telecommunications subsystems 318 could include any suitable devices similar to those of managed subsystems 18 and in the embodiment shown in FIG. 3, subsystems 318 include a third Private Branch Exchange telephone switch 312, a call accounting system 314, and a miscellaneous host 316, which could be another PBX, call accounting system, voice processing system, computer telephony interface (CTI) device, Automatic call distribution (ACD) device, internet server, or other suitable device. Furthermore, although not shown directly in FIG. 3, the cascaded switch arrangement of FIG. 2 could be attached to communications server 310 to control a plurality of managed subsystems in a similar manner as that described above in connection with FIG. 2.

As noted above with respect to communications paths 19 and 20, communications paths 311 may be any suitable connection for transferring information between the communications server 310 and telecommunications subsystems 318. In one preferred embodiment of the present invention, communications paths 311 include RS-232 serial cables connected between corresponding data ports on the communications server 310 and telecommunications subsystems 318. In another preferred embodiment, communications paths 311 comprise a standard telephone connection used to transfer data, such as a dial-up modem connection. Of course, any suitable connection can be used for communications paths 311 provided that information may be exchanged therethrough. Thus, an ISDN link, dial-up or dedicated modem link, a direct serial or parallel link, a wireless data link (including AM, FM, digital, or any other suitable modulation scheme), a packet-switched network, an internet interconnection, or any similar or equivalent connection can advantageously be used with the present invention.

The operation of system 10 will now be discussed in detail. As described above, one preferred embodiment the present invention includes a computer system, such as a personal computer, connected with one or more telecommunications devices through a communication path, and including operational software, a preferred embodiment of which is included as source code in the microfiche appendix. While the primary features and functions of the present invention provided by this operational software are described below, reference to the appendix by those of skill in the art will reveal many additional capabilities of the present invention.

Referring generally to FIGS. 1–3, in operation, system 10 receives and stores information necessary to control the operation of the managed telecommunication subsystems 18 connected thereto. Thus, when connected with PBX switch 22, system 10 stores information used to control the operation of PBX switch 22 including key button assignments, extension numbers, user name, etc. In addition, to facilitate maintenance and record keeping of the telecommunications system, system 10 also includes information relating to the physical layout of the telecommunications system, including the location, department code, and cable number of telephone stations connected thereto. Similar information can be stored in system 10 for any additional telecommunications subsystems 18 as necessary.

In one preferred embodiment, system 10 includes an internal database that includes a plurality of records, each including a plurality of values, used to control telecommunications subsystems 18. Each record can be indexed by any suitable means, for example, by an extension number of a telephone station connected with PBX telephone switch 22. Importantly, in accordance with the present invention, where telecommunications subsystems 18 include multiple different types of devices, a single record is stored that includes sufficient information to control each of the different types of equipment. For example, where similar data, such as extension number, is required for operation of both PBX telephone switch 22 and call accounting system 24, this information need only be stored once within a record in the internal database included in system 10. Of course, such information could be stored more than once for redundancy or back-up purposes.

Thus, where changes or updates are made to the configuration of the telecommunications system, the updated or modified data need only be entered once by an operator of system 10. That is, if a user of, for example, PBX switch 22 moves from one location to another, this change in location need only be recorded one time. System 10 will then reprogram first PBX switch 22, and any other of the managed telecommunications subsystems 18 as necessary to reflect this change in location. Thus, in accordance with the present invention, data stored in more than one of the telecommunications subsystems 18 need only be changed once in system 10 and will then be downloaded as appropriate to the telecommunications subsystems 18 when necessary.

Furthermore, system 10 will also take additional steps to facilitate this change in location. Specifically, for example, system 10 will reprint designation strips for all phones that included the moved station, updating of cable records, etc. Thus, in accordance with the present invention, data reflecting an update or change to the managed telecommunications system is only required from the user a single time—with system 10 automatically making additional updates, modifications and changes in response thereto. In this manner, maintenance of the system is greatly simplified and thus the time required for such maintenance is reduced.

Figure 11:
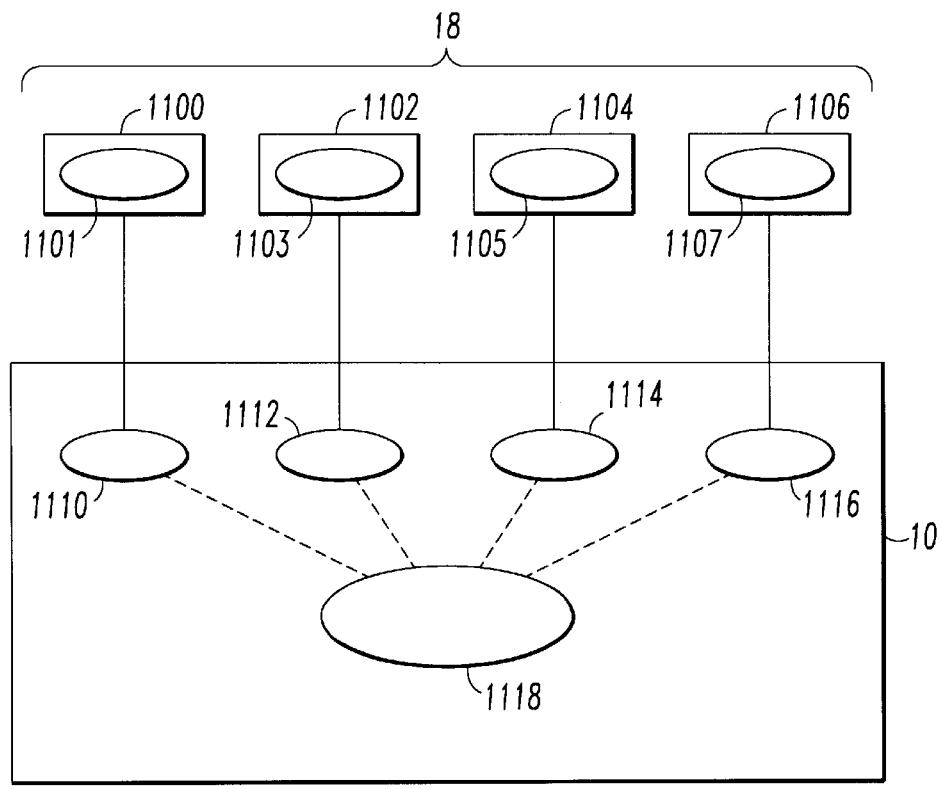
FIG. 11 shows a block diagram depicting one feature of the present invention wherein similar data, such as a name or extension number, need only be stored once within a record in an internal database of the present invention.

This feature of the present invention, where similar data, such as extension number, need only be stored once within a record in the internal database included in system 10, is illustrated more clearly in FIG. 11. As seen in FIG. 11 a plurality of managed subsystems 18, including managed subsystems 1100, 1102, 1104 and 1106, each include an internal database 1101, 1103, 1105 and 1107 containing operating information for the respective managed subsystem. The information contained in each of the internal databases 1101, 1103, 1105 and 1107 is transferred to system 10 and temporarily stored in databases 1110, 1112, 1114 and 1116 respectively. The information within these temporary databases are then compacted or compressed into a consolidated internal database 1118 stored within system 10.

Specifically, when receiving information from any of the managed subsystems, system 10 first performs protocol and connectivity conversion to recover the information depending on the specific type, brand and operating system of the managed subsystem 18 from which the information was received. System 10 then performs a relational compression of this information and stores the result within internal database 1118 such that common information stored within each of the managed subsystems need only be stored a single time within the internal database 1118 of system 10 as described above. A reverse process is followed to transfer information from the internal database 1118 of system 10 to one of the managed subsystems 18. Specifically, information is retrieved from the internal database 1118 and a suitable process is performed to format, or uncompress, the information into a suitable form for the managed subsystem 18 to which the information will be transferred. Thereafter, the information is placed into the proper protocol and transmitted to the appropriate managed subsystem 18.

Importantly, the present invention provides a system and method capable of seamlessly integrating differing telecommunications support products provided from various different manufacturers or having differing operating systems. Generally, each different manufacturer of telecommunications equipment provides a slightly different command structure, or protocol, to communicate with that equipment. Thus, referring to FIG. 1, while first telephone switch 22 may be made by a first manufacturer and require a first command sequence to provided to program a specific parameter, second telephone switch 23 could require a second, completely different, command sequence.

In accordance with the present invention, the ability to communicate with any number of differing types of telecommunications equipment employing any number of differing command structures or protocols is provided. Specifically, the telecommunications installation and management system of the present invention includes the ability to format commands in differing manners depending on the specific equipment attached thereto. Thus, prior to transferring data or other information to the telecommunications equipment to be controlled, this information is first properly formatted so as to be received and understood by the appropriate piece of equipment.

In a preferred embodiment of the present invention, a plurality of different software drivers are used based on the identity of the telecommunications equipment to be controlled by the system. Upon identification of the equipment by a user of the system, an appropriate driver is selected and used for all subsequent communication with that piece of equipment. Similarly, in accordance with the present invention, different software drivers are used for telecommunications equipment having different command structures and operating systems. Upon suitable identification of the equipment by a user, an appropriate driver is selected based on the known command structures and operating system parameters and used for all subsequent communication with that piece of equipment. In this fashion, the architecture of the software system is said to be "modular" or "object oriented."

Another important aspect of the present invention lies in the integration of the above described telecommunications equipment management and control with other telephony services typically performed either manually or through other special purpose equipment. Since detailed information on the operational parameters of each of the telecommunications equipment under control of the present invention is available, the present invention is uniquely situated to compile and output reports and other information that traditionally have been kept through manual records.

For example, tracking of repair requests can be easily implemented in accordance with the present invention by providing the ability to associate such requests with a predetermined record in the internal database within the system 10. While the recordation of such requests is not typically stored within the telecommunications equipment that is under the management and control of the present invention, this information can be included in the local database that also stores this information. Thus, in addition to storing parameters necessary to control the operation of the telecommunications equipment, the present invention also tracks ancillary information that can increase the efficiency of maintaining the telecommunications system.

When initially activated, system 10 provides a login screen to the user. Upon successfully entry of a user name and password, system 10 first attempts to communicate with each of the managed subsystems, for example telecommunications subsystems 18. If a problem is encountered in communicating with any of the managed subsystems, system 10 will display an appropriate error message and will normally temporarily suspend access until the communication problem is corrected. If, however, communications cannot be established, it is possible to operate system 10 in an "offline" mode. In this mode of operation, system 10 will not attempt to communicate with the managed subsystems and will not perform internal checks for standard data entry errors such as the existence of an extension record prior to allowing the number to be added to a button on a telephone station. Since error checking is not performed during data entry, prior to downloading the changed records to the managed subsystem, a check for any logical data entry errors can be performed at a later time as described below.

Upon successful communication with one or more of the managed subsystems, or upon initiation of offline mode, system 10 displays a main menu substantially as shown in FIG. 4. Of course, those of skill in the art will understand that the menu options shown in FIG. 4 can be modified or supplemented as required to provide user functionality. Importantly, however, one feature of the present invention is the provision of a standardized user interface that can be used to enter and change information that is used to control various different telecommunications devices. Thus, in accordance with the present invention, the main menu shown in FIG. 4 will have substantially the same appearance regardless of the telecommunications system to be managed and regardless of the differing devices used to make up that telecommunications system. Therefore, once an operator is familiar with the operation of the present invention, that operator will be able to update and control an almost unlimited number of differing devices without having to relearn a new command interface. Thus, whether the user is (1) managing and controlling an integrated telecommunications package including a PBX, call accounting system and voice messaging system made by a common manufacturer; (2) managing and controlling a telecommunications system including devices made by diverse manufacturers; or (3) managing and controlling multiple telecommunications systems, each having devices made by the same or diverse manufacturers, the same user friendly command interface is used.

As noted above, system 10 includes an internal database that includes a plurality of records, each including a plurality of fields containing information such as extension number, name, button assignment values, voicemail parameters, cable records, and other operational data. As generally designated at 400 in FIG. 4, system 10 includes several standard searches that can be used to locate a given record and display the contents of its fields. For example, a user can locate information regarding a particular telephone by entering an extension 402, last name 404, equipment number 406, location 408, or cable number 410 by selecting the appropriate entry from the main menu shown in FIG. 4. Other search criteria can be entered including room number, department, MDF and House Pair, and other user defined fields by selecting "Other Searches" option 412 from the main menu. Once a proper record is located, information may be changed and system 10 will automatically update all attached managed subsystems, such as telecommunications subsystems 18 shown in FIG. 1, as required.

When performing an extension 402 search, system 10 will prompt the user for a desired extension number. Upon entry of the last digit of the extension number, system 10 will locate the corresponding record and display it to the user as described below. In accordance with the present invention, system 10 can be configured to operate with variable length extension numbers. Generally, however, system 10 requires extension numbers to be unique for each record. Thus, if multiple records for the same extension are required (i.e. for multiple listing in a directory), the present invention provides a special field—the published number field—for this purpose.

The uniqueness requirement of the extension number serves to highlight one feature of one preferred embodiment of the present invention, which is described in more detail below in connection with the Utilities option 414 submenu. When receiving input from a user, system 10 checks that input to verify its validity prior to attempting to upload that information to a managed subsystem. In this manner, data entry errors that could effect the performance of the managed subsystem can be isolated and corrected prior to programming of the managed device. Thus, for example, where a user enters a duplicate extension number, system 10 will detect that duplicate entry and issue an error message to the user informing her of the duplicate extension number.

In addition, one important feature of the present invention lies in its ability to quickly detect duplicative effort in making data entries. Specifically, in accordance with one preferred embodiment of the present invention, multiple users are permitted to edit a single data record at the same time. If, however, multiple users attempt to modify the same information, system 10 will issue a warning indicating that only one user can modify that information.

The remaining search options—name 404, equipment number 406, location 408, and cable number 410—operate in a similar manner by prompting the user for a desired search criteria and then locating records that conform to that search criteria. The "other searches" option 412 provides a submenu of other fields that can be searched, preferably including the ability to search on a department name, house cable pair, MDF tie cable pair search, pick-up group search and/or data extension search. Of course, those skilled in the art will recognize that other fields and similar features for duplicate data tests could be added to this submenu to meet user demands.

From the above, it will be clear that the present invention provides comprehensive and complete searching capabilities to allow a user thereof to locate a desired record in a number of different manners. In accordance with the present invention, a record can be located based on whatever information is available to a user. When that information is not sufficient to isolate a single record, multiple records that satisfy the search criteria can be displayed in a summary form embodied as a "pop-up window" with spreadsheet-like attributes to allow the user to select the desired record for more detailed display. Thus, those of skill in the art will appreciate from the above description and the attached source code in the microfiche appendix that the present invention provides great flexibility to the user in selecting and locating a desired record for review or modification.

Once a desired record is located in the internal database of system 10 based on a given search criteria, the record will be displayed with the field used for the search highlighted to the user. The user may then scroll through the remaining records, indexed by the highlighted field, by pressing an appropriate key on input device 14 of system 10. Importantly, once a desired record is located, the user may change the highlighted search field and thereafter scroll through the remaining records as indexed by this new search field. Thus, upon locating a record by name, for example "Doe, John," the highlighted search field can be changed to the "location" field to index the database by location. Thereafter, records can be scrolled accordingly to location in order to view other telephone stations in the same or nearby location to the originally selected record in a logical, straight forward manner, avoiding the trouble of recalling the prior screen and making a different field search selection.

In addition, in order to facilitate selection of an appropriate record, system 10 provide the ability to display a shortened summary of a plurality of records at one time. Upon locating the desired record summary, a user may then access and display the detailed record by operation of an appropriate key on the input device 14. One method of activating this feature of "scanning" multiple records at a time is through actuation of an appropriate function key, such as F1, as described below.

A typical record 500 within the database of system 10 as it is displayed on output device 16 is shown in FIG. 5. As seen in FIG. 5, each record includes a plurality of fields that contain information for a given extension, user, or other unique field as generally indicated at 501. While many fields are displayed in FIG. 5, it is a further feature of the present invention that additional "hidden" fields can be present that are only displayed when specifically requested by a user. Furthermore, while FIG. 5 depicts an illustrative record display screen, the executable program as set forth in the attached software appendix allows new fields to be added, existing fields deleted, or the field display order rearranged as desired by the user of the system.

In addition, the record 500 also includes one or more status messages 502, where appropriate. For example, record 500 could display the message "upload required" as illustrated in FIG. 5. This status message indicates that the current record had some changes that were not successfully updated in one of the managed telecommunications device's operating database(s). As noted above, one feature of the present invention is to provide real-time access to a plurality of telecommunications devices and to facilitate real-time modification to operating parameters of these devices. Where the system 10 cannot make such real-time modifications, however, it will record such circumstance and notify the user that these changes could not be made. This may occur, for example, when attempting to update information in a PBX for telephone stations that are busy.

Figure 8:
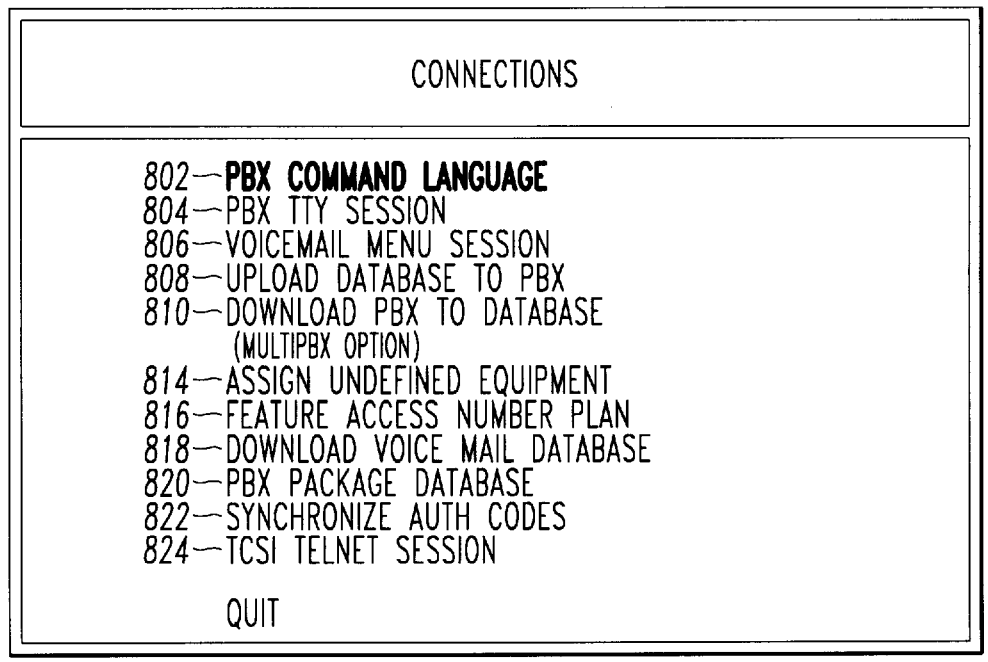
FIG. 8 illustrates a preferred layout for a System Connections submenu of a computer programmed in accordance with the present invention.

When such a situation occurs, the system 10 will attempt to retransmit these modifications the next time that the record 500 is edited. In addition, the user can actuate the F4 key on input device 14 to immediately attempt a retransmission of record 500. Furthermore, as described in more detail below, a summary report of all flagged records (including various status messages) can be generated by selecting the Work Order Log option 422 (FIG. 4) from the main menu. Also, where multiple records are marked as "upload required," the user can select the Upload to PBX option 808 (FIG. 8) under the System Connections option 424 (FIG. 4) to attempt a retransmission of all records that require uploading. This feature is described in more detail below in connection with FIG. 8, illustrating the System Connections option 424 submenu.

There are also several other status messages that could be displayed in this location in accordance with the present invention. First, the system 10 could display a "Work Order Open" message, which indicates that there are one or more work orders open for the currently displayed record. A summary of all open work orders can be received by selecting the Work Order Log option 422 (FIG. 4) from the Main Menu. In addition, system 10 could display a status message of "Comments Exist," indicating that the generic comments field for the currently displayed record has text in it. Of course, other status messages could easily be added in accordance with the present invention, as required.

Record 500 also includes a display of currently available function keys and associated functions, as generally designated at 504. Of course, the functions assigned to each function key can be varied to suit user applications and those illustrated in FIG. 5 are exemplary for one preferred embodiment of the present invention only. As seen in FIG. 5, the functionality for each function key is generally intended to streamline management of the telecommunications system. Thus, by pressing the F1 key, the user can place system 10 into a "scanning" mode wherein multiple records are displayed in summary form. For example, a summary of 13 records could be displayed on a single screen, thus allowing the user to more quickly review all records to locate a record for which more detailed information is desired. The user may then access this record and receive a record display similar to that shown in FIG. 5 for the selected record.

The F2 function key enters the edit mode, thus allowing the user to make changes to the information contained within the record. The editing of data is performed in any suitable manner common to computer database application, such as the presentation of the currently existing data to the user with the ability to modify or update that data as desired. Function key F3accesses the work order menu for the extension associated with the selected record. In the work order menu, the user can add, update, or close a work order for the extension associated with the displayed record. The F4 function key, as described above, causes the system 10 to immediately attempt to upload the currently displayed record to all managed telecommunications equipment. The F5 function key allows the user to modify and/or print designation labels for the telephone station associated with the currently displayed record.

The F6 function key instructs the system 10 to delete the currently displayed record. However, the system 10 will delete the record only if doing so will not require an update of a managed subsystem. Thus, this option is most useful when deleting a record that was added for purposes of tracking cable numbers or extra listings for a directory. If the record cannot be deleted through this function because an update of a managed subsystem would be required, the system 10 will instruct the user to use the Delete Extension Number option 420 from the Main Menu.

As previously discussed, the present invention provides for real-time management and control of a number of differing telecommunications subsystems through a single integrated database structure. Often, these subsystems will be geographically dispersed from each other. By operating the F7 function key, a user of the present invention can access only those records relating to a single device, such as a PBX. Operation of the F7 key causes a pick list to be present to the user from which a desired PBX or managed device can be chosen. Thereafter, only records for that PBX will be displayed until the user cancels the filter command.

The F8 function key instructs the system 10 to print the contents of the presently displayed record, including key station button assignments and comments.

The F9 function key bypasses the standard user friendly interface of system 10 and presents the user with a command line style interface to directly communicate with a selected telecommunications device through a direct TTY terminal session. This mode of operation is similar to the existing "dumb terminal" style of interface and is typically used for troubleshooting or native host programming.

The F10 function key access a PBX verb-noun command language interpreter to allow for entry of a verb-noun combination for accessing of a program template. This mode of operation should generally only be used when the parameters desired to be updated are not accessible through the standard record fields of system 10 and will only be available to the user when system 10 successfully attaches to and communicates with the PBX device. In this mode of operation, system 10 is similar to the Meridian Manager™ and Switchview systems discussed above.

Referring again to FIG. 4, the Utilities option 414 will now be described in more detail. When this option is selected, a Utilities submenu having a form substantially as illustrated in FIG. 6 is displayed to the user. As seen in FIG. 6, the Backup Database option 602 creates a backup disk or disks for the database stored within the system 10. As discussed above, one preferred embodiment of the present invention includes a personal computer having suitable mass storage capability, such as a hard disk, that contains the database used to store the information for the managed devices. The number of disks and time necessary to backup the database varies depending on the number of records in the database, which is related to the number and type of devices to be managed.

The second option, Reindex Database 604, re-sorts the database files used in the present invention. This option is performed in the event that the database order seems erratic or if searches fail to locate valid records. In addition, this option is performed whenever the present invention does not undergo an orderly shutdown (i.e. if the system experiences a power outage prior to exiting the system software). Again, as with the Backup Database option 602, the time required to reindex the system database depend on the number of records present in the database.

The Labels option 606 allows for printing of labels for terminal blocks, such as 66M150, 110 type, Bix, Krone, and patch panels, as well as station and equipment cable labels, facemats and designation strips.

The Pack Database option 608 is used to remove all records that have been marked for deletion and to simultaneously reindex the database as in the Reindex Database option 604. When a record is "deleted" using a delete command, that record will be removed from viewing and report functions, but the information will remain in the database structure until the database is packed. Thus, the present invention provides support for recovering "deleted" information prior to packing of the database from which the information has been deleted.

The Phone Count option 610 causes system 10 to count every type of phone present in the database and to display the total number for each phone type. This information is updated automatically as records are added, deleted or changed, thereby ensuring up-to-date and accurate information on system inventory. Where multiple PBX systems are being controlled, the present invention allows the user to pick a specific system for which the phone count will be performed. In addition, this option provides information for all PBXs in a system where multiple PBXs are present. Specifically, this option provides the following information:

(1) Current PBX (Allocated)—the total number of records by phone type for the current PBX including records that have not yet been assigned PBX equipment numbers; (2) Current PBX (Active)—the total number of records by phone type for the current PBX that have PBX equipment numbers assigned to them; (3) Entire Site (Allocated) the total number of records by phone type for all PBXs including records that have not yet been assigned PBX equipment numbers; (4) Entire Site (Active) —the total number of records by phone type for all PBXs that have PBX equipment numbers assigned to them. Where a single PBX is being managed and controlled by system 10, the "current" and "entire" results will be the same.

The Check and Load Database option 612 provides a further submenu of tests that can be performed by the present invention on the database structure contained within system 10. The different tests allow the system 10 to detect logical data entry errors such as the occurrence of duplicate data entries in the database structure of system 10. While the duplicate information may sometimes be valid (i.e. two employees having the same name), duplicate information may be the result of a data entry error or an error in customer information. The CHECK.PRG program discussed above performs this function in one preferred embodiment of the present invention.

This option will generally not correct any errors detected, but merely serves as a tool to aid the user in the detection of database errors. In most cases, the fewer duplicate entry and logical errors detected, the less likely an error will result when processing information during an add, delete or change process, or during the upload of the database information to a managed subsystem, such as a PBX system.

The Check and Load Database option 612 includes the following individual tests that can be performed on the database structure within system 10. First, the system checks for problems related to button assignments on telephone stations, such as digital phones, including checking that: (1) duplicate feature and extension numbers are not assigned on the same phone; (2) extension numbers assigned to buttons actually exist as valid records in the database structure of system 10; (3) extension numbers do not cross a PBX boundary in multiple PBX telecommunications systems; (4) no duplicate intercoms are assigned to the same phone; and (5) an extension number does not appear more than 31 times.

Second, the system checks for problems related to duplicate entry errors, button assignment errors, and the other additional database integrity errors. Specifically, system 10 checks for duplicate entry of the same prime extension number; the same exact name; the same room/location number; the same equipment number; the same cable number; the same MDF pair number; the same house cable pair number; and the same long distance authorization code.

In addition to the above, system 10 further checks for the following additional database integrity errors: (1) blank directory or LCD names; (2) blank equipment numbers for digital or analog telephone types; (3) blank location numbers for digital and analog telephones; (4) assigned mailbox class of service for extensions with mailboxes; (5) matching mailbox and prime extension numbers; (6) existence of pickup group pilot numbers; and (7) PBX boundary checks for pickup groups and button assignments.

The Vacant Numbers option 614 displays unassigned numbers in any given range of the database contained within system 10. This feature is particularly useful when assigning groups of phones or when trying to determine available numbers for planning purposes. The system prompts the user for the beginning and ending numbers of the range, and then displays all vacant numbers within that range.

The Create Microcall SDF File option 616 is used when the telecommunications system includes a Microcall Call Accounting system. This utility creates an export file that contains the appropriate database information from system 10 in a Standard Data Format (SDF). The Microcall system can then import this file prior to running any call accounting reports. In this manner, the requirement to manually update the Microcall system, or another brand of call accounting system, is eliminated.

The Export Dial-By-Name option 618 creates an export disk for use with a Fujitsu Dial-By-Name server, thus eliminating the need to manually update entries in the Dial-By-Name server. The file created by this option can be imported to the Fujitsu Dial-By-Name server, or to any other suitable device.

The Site Profile option 620 displays the set-up information for the system 10, including customer name and address, emergency contact numbers, communications speed settings, DID number ranges, printer adjustments, field names, data entry format requirements, field validity expressions, and other miscellaneous system default values.

The Add New Station Record option 622 is used to add miscellaneous records that do not have an associated extension number assigned thereto. That is, this option is used to add records for stations cables, router ports, etc., all of which do not have a unique extension number associated therewith. Similarly, the Remove Station Record option 624 and the Print Station Records option 626 are used to delete and print such records contained within the internal database of system 10.

Referring again to FIG. 4, the Assign Extension Number option 416 will now be discussed in more detail. Specifically, this option is selected every time a user wishes to add a new station to the managed telecommunications network. System 10 will automatically choose an available extension and equipment number, or the user may enter a choice of her own. Furthermore, minimal additional information will be required to be supplied, depending on the configuration of the telecommunications system to be managed. Generally, the minimal information required includes phone type, and the name and location of the user. System 10 will display a default phone type that can be accepted or modified by the user. In addition, if the user is unsure about the proper phone type, they may type a letter of the alphabet and system 10 will display a list of valid phone types that can be scrolled through for selection by the user.

Once a phone type has been selected, system 10 will check for an available PBX equipment number for the given type of phone. System 10 will display the lowest vacant extension number and the user may choose this extension, or search for and enter another available number. If the user entered number is not, in fact, available, system 10 will issue an error message and assign the next highest available extension number from the number requested. Once an available number is selected, system 10 will display a data entry screen to the user. Upon entry of this information, system 10 will automatically program a PBX, Voicemail, and any other related subsystems connected thereto as described above. Furthermore, if the telecommunications system is a multi-PBX network, system 10 will also automatically update the specific routing tables in each PBX node to ensure proper on-net dialing, name display and feature transparency for the new station. In this manner, synchronization is maintained between all related subsystems (nodes and peripherals) to ensure proper interrelation and operation of these subsystems.

The Change Extension Number option 418 allows a user to change an extension number in a managed PBX, including pick-up groups, hunt groups, and the line appearance on other telephones. Again, importantly, system 10 will also automatically update voicemail, call accounting, and other systems with the changed information where appropriate.

The Delete Extension Number option 420 is used to delete an extension and associated record from the database contained within system 10. When this option is selected, system 10 will display the Name for the selected extension and any line appearances of this extension on other phones. System 10 will then ask for confirmation to delete this extension. If the user confirms deletion, system 10 will remove all button assignments on the phone, and remove all pickup groups, hunt groups, call forwarding and message waiting information associated with the extension. Phones on which the deleted phone would appear on a feature button are also updated appropriately. System 10 will retain cable information for the given location for later re-use unless the cable number, house pair and MDF pair fields are blanked prior to deleting the record. In addition, if the station is a digital station and a data device (DTA) is defined for that station, then the data device will also be removed along with the station record.

If the extension is a Pickup group Pilot station, system 10 will display the members of the group and allow the user to select a new number as the pilot for that group. If a voicemail box is assigned to the extension, system 10 will prompt the user to confirm deletion of the associated voicemail box as well. Finally, system 10 will remove the record from view in any further searches or reports. System 10 will temporarily maintain the record information on the system until such time as a pack database command is issued. Until that time, the information may be restored if necessary.

Figure 7:
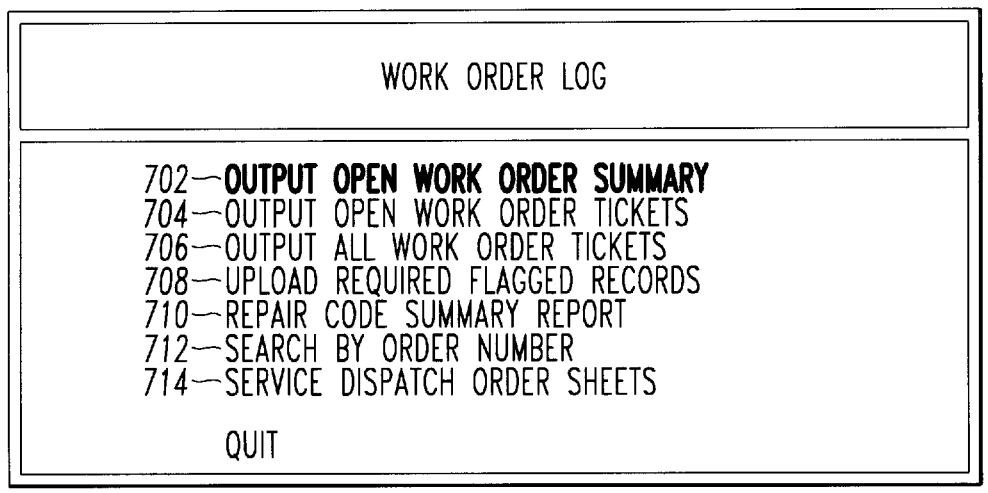
FIG. 7 illustrates a preferred layout for a Work Order submenu of a computer programmed in accordance with the present invention.

Referring again to FIG. 4, the Work Order Log option 422 will now be described in more detail. When this option is selected, a Work Order submenu having a form substantially as illustrated in FIG. 7 is displayed to the user. The Work Order submenu generally offers choices to view and print work orders based on a variety of selection criteria. Specifically, the Output Open Work Order Summary option 702 will display the name, extension and room number of all open work orders to the system user. Similarly, the Output Open Work Order Tickets option 704 outputs an entire work order, containing all information contained within the database in system 10, for each open order. Generally, this report will provide the extension, name, department, equipment number, cable information, button assignments, trouble reported, date and time order was received, person placing the order, etc. for each open work order. Each order is printed on a separate sheet, with a "signature" and "work completed" area for a technician to complete prior to closing the work order. The Output All Work Order Tickets option 706 is similar to the Output Open Work Order Tickets option 704 except that a complete work order is output for every work order in the database of system 10 instead of just for open work orders. Of course, additional features could be added to the Work Order submenu as desired, including a technician logon/off capability; time tracking capability; mapping capability wherein the system would generate a map to the location where trouble was suspected; and key procurement and control procedures.

The Upload Required Flagged Records option 708 produces a report listing the names and extensions of all records in the database that are not synchronized with one or more managed subsystems, including a PBX, Voicemail, or call accounting system. All records entered in offline mode, or that encounter an error during an upload process, are flagged as requiring an upload.

The Repair Code Summary Report option 710 produces a report based on a date range of given work order activity. All work orders are summarized into categories when they are closed, including addition, deletion, program changes, voicemail problem, cable problem, equipment problem, telephone company problem, no trouble found, end-user, policy and other categories.

The Search by Order Number option 712 allows the user of system 10 to locate a work order based on an assigned work order number, which are automatically generated when a work order is initially opened. Finally, the Service Dispatch Order Sheets option 714 produces a report containing basic installer information used for organizing departmental moves or activities involving the relocation of up to 20 phones. System 10 prompt the user to enter a list of up to 20 extension numbers and then produces a report containing the extension, equipment number, name, department, cable and room number information.

Referring again to FIG. 4, the System Connections option 424 will now be described in more detail. When this option is selected, a System Connections submenu having a form substantially as illustrated in FIG. 8 is displayed to the user. The system connections submenu generally contains selections which allow the user of system 10 to establish direct connections with various managed subsystems connected thereto. Specifically, the PBX Command Language option 802 provides access to a PBX command interpreter for direct verb-noun command input. Verb-noun type commands can be generally issued to access a series of help fields and menus for a "fill in the blank" type of PBX programming template. The resulting screens and general input format are similar to that found in, for example, the Fujitsu EMML System. In addition, commands can also be issued in an EMML format with comma delimited arguments for direct download to the PBX or other managed subsystem(s). Where there are multiple managed subsystems including, for example, multiple PBX systems, a two or three (or more) character PBX identifier, which is assigned to each PBX in a profile setting of system 10, can be prefixed before each entered command. In this manner, quick selection of command based programming of any managed subsystem in a network can be accomplished without requiring time consuming login and/or manual dial up procedures.

Importantly, when changes are made from the PBX command line, the internal database contained within system 10 is not updated. Therefore, the use of the PBX Command Language option 802 should only be used to make changes or inquiries to a managed subsystem that is not normally accessible through the other menus and options provided within system 10. Otherwise, loss of synchronization between the internal database stored within system 10 and the operational database within the managed subsystem can result.

The PBX TTY Session option 804 initiates a direct TTY console session using the communication parameters and communication port established in the profile configuration of system 10. This mode of operation is generally used as a troubleshooting tool to communicate with a managed subsystem or modem, and allows a user to bypass any controls placed upon the communication link by system 10.

The Voicemail Menu Session option 806 accesses a voicemail system console screen and performs an automated login to the voicemail system. A user of system 10 may then issue programming commands to the voicemail system using the native voicemail programming language and syntax. As with the PBX Command Language option 802, changes made to the voicemail system using this option do not update the internal database stored within system 10. Therefore, loss of database synchronization between the internal database within system 10 and the database within the voicemail system can occur and resynchronization will be required.

The Upload Database to PBX option 808 transfers information stored within the internal database of system 10 to an operational database within a PBX or other managed subsystem. System 10 can send the entire database contents or only information contained in specifically flagged records, such as records flagged as "upload required" as discussed above. By uploading only the flagged records, synchronization between the internal database within system 10 and the operational database within the PBX or other managed subsystem can quickly be achieved. In the alternative, if the user chooses to upload all records within the internal database of system 10, then system 10 will send the contents of every station record contained therein to the PBX or other managed subsystem and will override all corresponding existing programming information contained within that managed subsystem. This type of upload is usually only performed at the time of an initial system installation, or as part of catastrophic recovery procedure, etc.

The Download PBX to Database option 810 is used to replace all information within the internal database of system 10 with the related information located in a PBX or other managed subsystem. System 10 will query the PBX or other managed subsystem for extension, call forwarding, class of service, pickup group, button assignment information, etc. and will replace its existing information with the information collected from the PBX or other managed subsystem. In the event that system 10 does not contain any information at all (including any record) corresponding to the received extension number, system 10 will create a new record for that extension and will use the available information from the PBX or other managed subsystem to populate the fields within that record wherever possible. This operation is normally used only when changes have been made to a PBX without the use of system 10, or when installing system 10 at a new location that already has an installed telecommunications system for the purpose of constructing an initial database within system 10.

The Assign Undefined Equipment option 814 is normally only used to assign PBX equipment numbers for station records that have been entered in the offline edit mode. This procedure automatically assigns equipment numbers to both digital and analog telephone types within the internal database of system 10 so that they may be activated in the Check and Load Database option 612 discussed above in connection with FIG. 6. The packages that will be needed for the desired station records must first be installed using the PBX Package Database option 820 discussed below in order for this routine to function properly. System 10 evaluates the available PBX packages and assigns equipment numbers based on the phone type contained in each record. System 10 then assigns equipment numbers sequentially based on the MDF pair and/or room location to facilitate efficient cross connections at the MDF.

The Feature Access Number Plan option 816 is used to organize, synchronize, assign and delete access codes to various features in the PBX or other managed subsystems such as call forwarding, group pick up, etc. This option allows access to the "global" features database, as well as the per switch numbering plan and trunk group assignment databases.

The Download Voicemail Database option 818 is used to replace all information within the internal database of system 10 with the corresponding information located in a voicemail system. System 10 will query the voicemail system for mailbox number, name, department, mailbox feature, class of service and attendant escape number and other data. System 10 will then replace all corresponding existing information with the new information collected from the voicemail system or, in the event that system 10 does not contain any information for a given extension, system 10 will create a new record and use the voicemail system information to populate the fields where possible.

The PBX Package Database option 820 is used to assign new station trunk and other miscellaneous circuit card packages in the PBX or other managed subsystem. This option is also used to synchronize an existing PBX package database with the package database contained within system 10 for new installations, or if circuit card packages are installed in the PBX in the offline mode or using EMML, or to facilitate large reconfigurations.

The SYNCHRONIZE AUTH CODES option 822 verifies the existence of all dialing authorization codes located within the internal database of system 10 for each PBX or other managed subsystem. System 10 queries the OFF-CODE table or tables in each PBX or other managed subsystem and compares the entries with the OFFCODE value of each record within system 10. If an entry is found in the internal database of system 10 that is not located in the PBX table or tables, system 10 will automatically program the OFFCODE in the PBX. Furthermore, if an OFFCODE is found in a PBX, but is not contained within a valid record of system 10, system 10 will delete the OFFCODE from the PBX. This prevents unauthorized use of PBX trunk routes or unaccounted billing records. Therefore, it is important to make sure that all records requiring authorization codes within the internal database of system 10 have been updated prior to running this procedure.

The TCSI TELNET SESSION option 824 allows a communication session to occur between the present invention and another Host utilizing the Telnet protocol. The IP address of the Host system must be entered into system 10 and a Local/Wide area network interface card must be equipped in the system 10 to establish the Telnet session. Telnet sessions are useful because many Hosts use this standard protocol for remote access to configuration and management functions in addition to any direct serial, hardwire or dialup communication interface ports.

Referring again to FIG. 4, Trunk Information option 426 provides a submenu containing information on PBX trunks, trunk groups, carrier information, circuit ID and trunk related repair orders. The View/Print Reports option 428 accesses a report generator contained within system 10. The report generator allows a user to create reports by selecting the fields, sort order, and any special filters that should be applied to the report. The resulting reports can be viewed on screen prior to printing or saved to a ASCII text file. Furthermore, the selected report criteria can be saved under unique report names for later duplication.

Finally, the QUIT option 430 terminates operation of the program contained within system 10, closes all open database files and writes any information in memory to the mass storage device(s), including mirrored information stored on a RAID or similar device.

Figure 9:
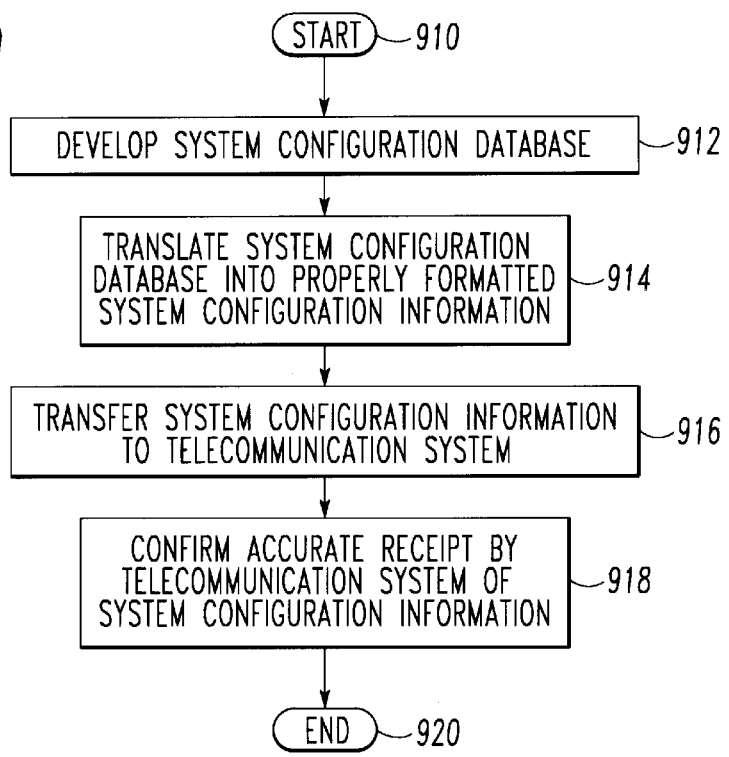
FIG. 9 illustrates an overview of a preferred method for developing, translating, transmitting and confirming receipt of operational parameters for managed subsystems of a telecommunications system in accordance with the present invention.

Referring next to FIG. 9, an overview of a preferred method for developing, translating, transmitting and confirming receipt of operational parameters for managed subsystems of a telecommunications system in accordance with the present invention is illustrated. As can be seen in FIG. 9, the process begins at block 910. Next, in block 912, a system configuration database is developed. The development of the system configuration database could be accomplished in a number of different and advantageous ways depending on the objective to be achieved. For example, if it is desired to merely add a new user or to change the location of an existing user, this updated information may be manually entered into an existing system configuration database by an operator in a manner described above in connection with FIGS. 4-8. In the alternative, if a new or upgraded component of a telecommunications system is to be installed, system configuration information could first be downloaded from the old component and any desired changes entered therein to form the system configuration database.

Upon development of the system configuration database, control transfers to block 914, where the system database is translated into system configuration information having a suitable format for the desired telecommunications device or devices. That is, depending on the telecommunications devices that are to be updated or reprogrammed, the data contained in the system configuration database is converted into a format suitable for transmission to the desired telecommunications system. This format can vary depending on the make or model of the telecommunications device to be reprogrammed and further depending on the specific command structure and operating systems employed in such devices. As previously noted, in accordance with one preferred embodiment of the present invention, a plurality of software drivers are provided to facilitate communications between system 10 and a number of differing managed subsystems. Any necessary format conversion is preferably performed by these driver routines, thus increasing the flexibility and adaptability of the present invention.

Next, in block 916, the formatted system configuration information is transferred to the appropriate managed telecommunications subsystems. As described above in connection with FIG. 1-3, the transmission of this information can be perform in a variety of ways depending on the physical configuration of the telecommunications system. Importantly, were multiple differing managed subsystems make up the telecommunications system, the configuration information will be transferred to each of these system in a suitable format.

After transmission of the formatted configuration information, control transfers to block 918, where the system 10 confirms receipt of the system configuration information by each of the managed subsystem. In this manner, system 10 confirms that the system configuration information was properly received and processed by each of the managed subsystems. After this confirmation, system 10 discards the previous information and updates its internal database appropriately, thus ensuring synchronization between the internal database contained with system 10 and the operation databases within each of the managed subsystems.

Figure 10A:
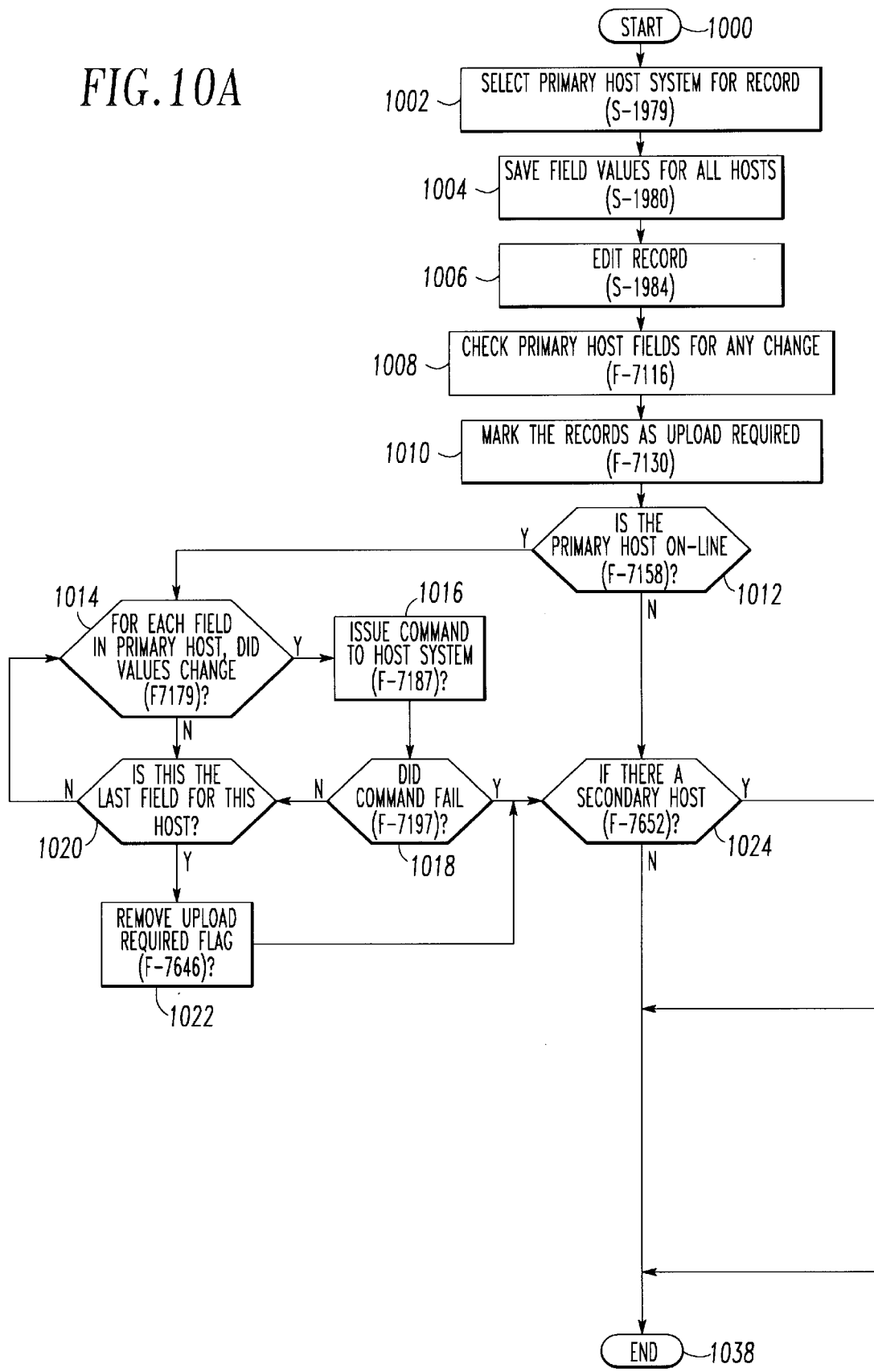
FIG. 10 shows a flowchart illustrating one preferred method for transmitting operational parameters to managed subsystems and for confirming accurate receipt of such operational parameters by the managed subsystems in accordance with the present invention as illustrated.
Figure 10B:
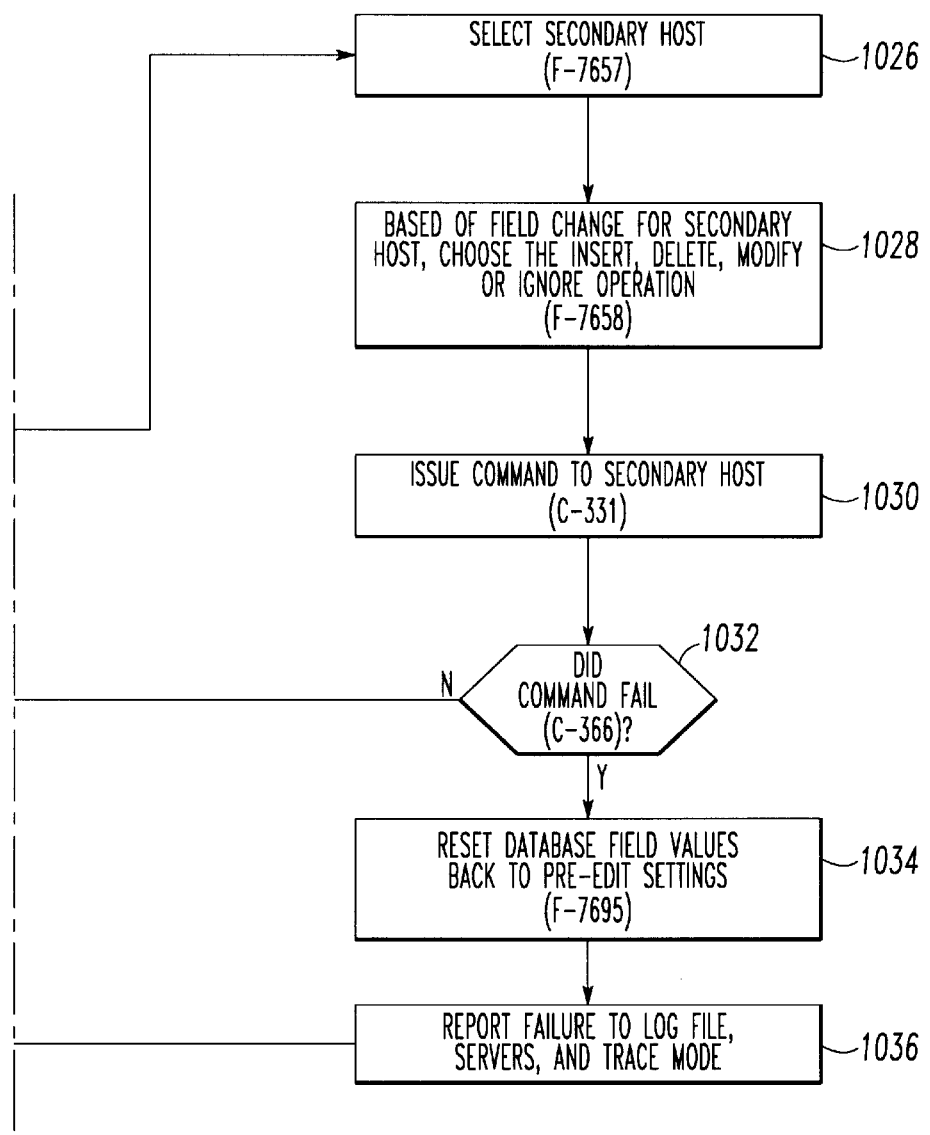

Referring next to FIG. 10, a flowchart illustrating one preferred method for transmitting operational parameters to managed subsystems and for confirming accurate receipt of such operational parameters by the managed subsystems in accordance with the present invention is illustrated. In FIG. 10, references to the line number for various modules of the source code contained in the microfiche appendix are included to facilitate review thereof. Specifically, an "S" designation indicates that the following number refers to a line number in the SITE.PRG program; an "F" designation indicates that the following number refers to a line number in the F9600.PRG program; and a "C" designation indicates that the following number refers to a line number in the CENTIGRA.PRG program.

As seen in FIG. 10, the process begins in block 1000. Control transfers to block 1002, where a primary managed host system for the record to be downloaded is identified and selected. Reference to line 1979 of the SITE.PRG program in the microfiche appendix is made for further information on the specific details of this step. Typically, the primary host system could be a Private Branch Exchange telephone switch, such as a Fujitsu 9600 PBX switch. Control then transfers to block 1004, where the system saves field values for all Host subsystems.

Subsequently, in block 1006, editing of the selected record is permitted by the user to enter or change information as desired. Upon completion of the modifications to the record, control transfers to block 1008, where the system 10 determines if any fields that impact the operation of the primary host subsystem have changed. If any fields have changed, the system marks the record as "upload required" in block 1010.

Next, in block 1012, system 10 determines in the primary host subsystem is online. If the primary host subsystem is online, control transfers to block 1014, where it is determined if any operational data was changed for each field in the primary host subsystem. If a field in the primary host subsystem was changed, control transfers to block 1016, where an appropriate command is issued to the host subsystem to update the appropriate operational data field. Control then transfers to block 1018, where the system 10 determines if the command issued failed. if the command did not fail, thus indicating that the primary host field was properly updated, control transfers to block 1020, where system 10 determines if this is the last data field for the primary host. If not, control returns to block 1014, to form a download loop to recursively process all data fields for the primary host subsystem. Similarly, as seen in FIG. 10, if the determination in block 1014 is negative, control likewise passes to block 1020 to check if additional fields remain to be processed. When block 1020 indicates that the last field has been processed, control transfers to block 1022, where the upload required flag for the given record is removed.

Upon removal of the upload required flag, control passes to block 1024 for processing of a secondary host subsystem. As seen in FIG. 10, block 1024 is also reached if a command to the primary host subsystems fails in block 1018. In such case, since the primary host subsystem could not be completely updated, the "upload required" flag remains set, thus indicating to system 10 that the primary host is not synchronized with the internal database in system 10 and that uploading of this information should be re-tried at a later time. In addition, block 1024 can be reached from block 1012, if it is determined that the primary host subsystem is not online. Again, in such case, the "upload required" flag set in block 1010 will remain set and uploading of the primary host information can be re-tried at a later time.

In block 1024, system 10 first determined if a secondary host subsystem is present. If not, control passes to block 1036 and the process ends. If there is a secondary host subsystem present, control passes to block 1026, where the secondary host subsystem is selected. Control then passes to block 1028, where appropriate action is taken with respect to the secondary host subsystem depending on the field change. Specifically, depending on the field change, information will be inserted, modified, deleted or ignored in the secondary host subsystem.

Control then transfers to block 1030, where an appropriately formatted command is issued to the secondary host subsystem. In block 1032, the system 10 determines if the command failed, similar to block 1018 with respect to the primary host subsystem. If not, control transfers to block 1036 and the process ends. Of course, although not shown in FIG. 10, a similar recursive loop like the type used in connection with the updating of the primary host subsystem could be employed with respect to the secondary host subsystem if necessary.

If the command failed, control transfers to block 1034, where the values of the internal database in system 10 are reset to the pre-edit settings. Thereafter, control transfers to block 1036, where the system records the command failure in a log file, notifies servers of the error, and reports the error to a trace mode routine. The process then ends at block 1036.

As described above, the present invention provides a system and method that reduces the time, effort and cost associated with the installation and maintenance of a telecommunications system. More interrelationships between data and more changes of cascaded events as a result of interlinked data are anticipated. Cascade of programming as a result of interrelationships of data represents one of the key contributing novelties to the time and cost saving elements of the present invention. Real-time or near real-time communications is also novel as it applies to two (2) or more managed devices. Project management, data, cable records, trouble tickets, etc. also important as interrelationships are important here as well.

As can be seen from the foregoing, a telecommunications installation and management system and method formed in accordance with the present invention reduces the time, cost and effort required in managing, controlling, updating and monitoring a telecommunications device, such as a private branch exchange telephone switch, voice messaging system, call accounting system, central office telephone switch, router, bridge, hub, or any other associated peripheral telecommunications equipment. A plurality of different types of telecommunications equipment provided by various different manufacturers using differing operating systems can be managed and controlled using the present invention through a single point of control for both system management and data entry. A local database within the telecommunications system provides for real-time or near real-time access and modification of programming information for the telecommunications equipment and further provides for redundancy in the event that the telecommunications equipment should fail.

Of course, those of skill in the art will recognize that additional features and capabilities could be included in the present system and still fall within the scope of the present invention. For example, the user interface could be modified to include additional graphical features consistent with standard graphical user interface applications. In addition, any number and variety of communications devices can be efficiently managed and controlled through a single central location in accordance with the present invention, thus reducing the costs and time involved in maintaining such systems.

I claim:

1. A telecommunications system installation and management apparatus for controlling the operation of at least two telecommunications devices each of which have a database containing configuration data used to control the operation of the device stored therein and each of which use different protocols for external communication with the installation and management apparatus, comprising:

a computer database system containing configuration data used to control the operation of the telecommunications devices;

data input means for receiving commands from a user to control said computer database system and for receiving configuration data from said user to be stored in said computer database system;

display means for displaying configuration data stored in said computer database system to said user;

communication means connected with the at least two telecommunications devices for transferring data between the telecommunications devices and the telecommunications system installation and management apparatus; and control means operatively connected with said computer database system, said data input means, said display means, and said communication means, said control means operating to retrieve configuration data to be transferred to one of the at least two telecommunications devices from said computer database system, to generate a first telecommunications device control command by converting said configuration data into a protocol suitable for use with said one of the at least two telecommunications devices, and for transferring said first telecommunications device control command to said one of the at least two telecommunications devices using said communication means, whereby said configuration data stored in said database of at least one of said two telecommunications devices is modified.

2. The telecommunications system installation and management apparatus of claim 1 wherein said control means comprises a central processing unit of a personal computer and said computer database system comprises a database stored within a memory of said personal computer.

3. The telecommunications system installation and management apparatus of claim 2 wherein said data input means comprises a keyboard connected to said personal computer and said display means comprises a video display terminal connected with said personal computer.

4. The telecommunications system installation and management apparatus of claim 2 wherein said control means further comprises a computer program stored within said memory of said personal computer, said computer program operating to generate said first telecommunications device control command by converting said configuration data into a protocol suitable for use with said one of the at least two telecommunications devices.

5. The telecommunications system installation and management apparatus of claim 1 wherein each of the at least two telecommunications devices is one of a private branch exchange system, a call accounting system, and a voice messaging system.

6. The telecommunications system installation and management apparatus of claim 5 wherein each of the at least two telecommunications devices is a private branch exchange system.

7. The telecommunications system installation and management apparatus of claim 6 wherein each of the at least two private branch exchange systems is made by different manufacturers.

8. The telecommunications system installation and management apparatus of claim 1 wherein the at least two telecommunications devices include at least one private branch exchange system and at least one of a call accounting system and a voice messaging system.

9. The telecommunications system installation and management apparatus of claim 8 wherein said at least one private branch exchange system and said at least one of a call accounting system and a voice messaging system are made by different manufacturers.

10. The telecommunications system installation and management apparatus of claim 1 wherein each of the at least two telecommunications devices is one of a telecommunications switching system, a call accounting system, a voice messaging system, a router, a bridge, a data switch, a concentrator and a hub.

11. The telecommunications system installation and management apparatus of claim 1 wherein said communication means comprises a modem.

12. The telecommunications system installation and management apparatus of claim 1 wherein said communication means comprises one of a serial interface cable, wireless communication system, network interface card, FDDI, CDDI, a synchronous transfer mode adaptor, satellite downlink, and ISDN terminal adaptor.

13. The telecommunications system installation and management apparatus of claim 1 wherein said control means further operates to receive an acknowledgement from said one of the at least two telecommunications devices using said communication means, said acknowledgement confirming that said first telecommunications device control command was received and processed by said one of the at least two telecommunications devices.

14. The telecommunications system installation and management apparatus of claim 1 wherein said control means further operates to generate a second telecommunications device control command by converting said configuration data into a protocol suitable for communication with another of said at least two telecommunications devices and to transfer said second telecommunications device control command to said another of said at least two telecommunications devices using said communication means.

15. The telecommunications system installation and management apparatus of claim 14 wherein said one of the at least two telecommunications devices is a private branch exchange telephone switch and said another of the at least two telecommunication devices is one of a call accounting system and voice messaging system.

16. The telecommunications system installation and management apparatus of claim 15 wherein said one of the at least two telecommunications devices and said another of the at least two telecommunication devices are made by different manufacturers.

17. The telecommunications system installation and management apparatus of claim 1 wherein said communication means is permanently connected with the at least two telecommunications devices.

18. The apparatus of claim 1 wherein said computer database system and said control means comprise at least a portion of one of the at least two telecommunications devices.

19. The apparatus of claim 1 wherein said control means further functions to detect a change in said configuration data in said computer database system and operates to retrieve said configuration data to be transferred to one of the at least two telecommunications devices from said computer database system in response to said change.

20. The apparatus of claim 1 wherein said computer database system includes a plurality of data records containing configuration data used to control the operation of the at least two telecommunications devices, and said control means further operates to store said configuration data received from said user in one of said plurality of records and to modify at least one other of said plurality of records in response to said configuration data received from said user.

21. The apparatus of claim 1 wherein said control means further operates to synchronize the configuration data stored in the computer database system of the apparatus with the configuration data stored in one of the at least two telecommunications devices.

22. The telecommunications system installation and management apparatus of claim 1 wherein said communication means is operatively connected with said one of the at least two telecommunications devices only when said control means operates to transfer said first telecommunications device control command to said one of the at least two telecommunications devices.

23. An apparatus for maintaining a synchronized copy of configuration data stored in a database within a telecommunications device and used to control the operation of the device, comprising:
   a computer database system including a plurality of data records for storing said synchronized copy of said configuration data;
   communication means connected with the telecommunications device for transferring data between the telecommunications device and the apparatus; and
   control means operatively connected with said computer database system and said communication means, said control means operating to detect a change in said configuration data stored in the database within the telecommunications device and to modify at least one of said plurality of data records in said computer database system in response to said change.

24. A method for controlling the operation of at least two telecommunications devices each of which have a database containing configuration data used to control the operation of the telecommunications device stored therein and each of which use different protocols for external communication, comprising the steps of:
   generating, in a device different from said at least two telecommunications devices, a database containing information indicative of said configuration data;
   modifying said information indicative of said configuration data in response to at least one command received from a user;
   retrieving said modified information from said database containing information indicative of said configuration data;
   generating a first telecommunications device control command by converting said modified information into a protocol suitable for use with one of the at least two telecommunications devices;
   transferring said first telecommunications device control command to said one of the at least two telecommunications devices; and
   modifying the configuration data stored in said database of at least one of said two telecommunications devices in response to said first telecommunications device control command.

25. The method of claim 24 wherein said device different from said at least two telecommunications devices comprises a personal computer and a database stored within a memory of said personal computer.

26. The method of claim 24 wherein each of the at least two telecommunications devices is one of a private branch exchange system, a call accounting system, and a voice messaging system.

27. The method of claim 26 wherein each of the at least two telecommunications devices is a private branch exchange system.

28. The method of claim 27 wherein each of the at least two private branch exchange systems is made by different manufacturers.

29. The method of claim 24 wherein the at least two telecommunications devices include at least one private branch exchange system and at least one of a call accounting system and a voice messaging system.

30. The method of claim 29 wherein said at least one private branch exchange system and said at least one of a call accounting system and a voice messaging system are made by different manufacturers.

31. The method of claim 24 further comprising the step of receiving an acknowledgement from said one of the at least two telecommunications devices, said acknowledgement confirming that said first telecommunications device control command was received and processed by said one of the at least two telecommunications devices.

32. The method of claim 24 further comprising the steps of:
generating a second telecommunications device control command by converting said modified information into a protocol suitable for communication with another of said at least two telecommunications devices; and
transferring said second telecommunications device control command to said another of said at least two telecommunications devices.

33. The method of claim 24 further comprising the steps of:
retrieving configuration data stored in said database of at least one of said two telecommunications devices;
converting said retrieved configuration data into information indicative of said configuration data suitable for storage in said device different from said at least two telecommunications devices; and
storing said information indicative of said configuration data into said database in said device different from said at least two telecommunications devices.

34. A telecommunications system installation and management apparatus for controlling the operation of at least one telecommunications device having a database containing configuration data used to control the operation of the device stored therein and operatively connected through a communications path with the apparatus, comprising:
a computer database including a plurality of data records containing configuration data used to control the operation of the at least one telecommunications device;
data input means for receiving configuration data from a user to be stored in one of said plurality of data records in said computer database; and
control means operatively connected with said computer database and said data input means, said control means operating to store said received configuration data in said one of said plurality of records and to modify at least one other of said plurality of records in response to said received configuration data,
wherein said control means further operates to generate a first telecommunications device control command by converting said received configuration data into a protocol suitable for use with said at least one telecommunications device, and for transferring said first telecommunications device control command to said at least one telecommunications device using the communications path, to access said at least one other of said plurality of records to retrieve modified configuration data therefrom, to generate a second telecommunications device control command by converting said modified configuration data into a protocol suitable for use with said at least one telecommunications device, and for transferring said second telecommunications device control command to said at least one telecommunications device using the communications path, and
wherein said at least one telecommunications device comprises a PBX telephone switch and a call accounting system, and said first telecommunications device control command is transferred to said PBX telephone switch and said second telecommunications device control command is transferred to said call accounting system.

35. The apparatus of claim 34 wherein said computer database system and said control means comprise at least a portion of one of the at least two telecommunications devices.

36. A telecommunications system installation and management apparatus for controlling the operation of at least one telecommunications device having a database containing configuration data used to control the operation of the device stored therein and operatively connected through a communications path with the apparatus, comprising:
a computer database including a plurality of data records containing configuration data used to control the operation of the at least one telecommunications device;
data input means for receiving configuration data from a user to be stored in one of said plurality of data records in said computer database; and
control means operatively connected with said computer database and said data input means, said control means operating to store said received configuration data in said one of said plurality of records and to modify at least one other of said plurality of records in response to said received configuration data,
wherein said control means further operates to generate a first telecommunications device control command by converting said received configuration data into a protocol suitable for use with said at least one telecommunications device, and for transferring said first telecommunications device control command to said at least one telecommunications device using the communications path, to access said at least one other of said plurality of records to retrieve modified configuration data therefrom, to generate a second telecommunications device control command by converting said modified configuration data into a protocol suitable for use with said at least one telecommunications device, and for transferring said second telecommunications device control command to said at least one telecommunications device using the communications path, and
wherein said at least one telecommunications device comprises a PBX telephone switch and a voice messaging system, and said first telecommunications device control command is transferred to said PBX telephone switch and said second telecommunications device control command is transferred to said voice messaging system.

37. The apparatus of claim 36 wherein said computer database system and said control means comprise at least a portion of one of the at least two telecommunications devices.

38. A telecommunications system installation and management apparatus for controlling the operation of at least one telecommunications device having a database containing configuration data used to control the operation of the device stored therein and operatively connected through a communications path with the apparatus, comprising:

a computer database including a plurality of data records containing configuration data used to control the operation of the at least one telecommunications device;

data input means for receiving configuration data from a user to be stored in one of said plurality of data records in said computer database; and control means operatively connected with said computer database and said data input means, said control means operating to store said received configuration data in said one of said plurality of records and to modify at least one other of said plurality of records in response to said received configuration data, wherein said control means further operates to generate a first telecommunications device control command by converting said received configuration data into a protocol suitable for use with said at least one telecommunications device, and for transferring said first telecommunications device control command to said at least one telecommunications device using the communications path, to access said at least one other of said plurality of records to retrieve modified configuration data therefrom, to generate a second telecommunications device control command by converting said modified configuration data into a protocol suitable for use with said at least one telecommunications device, and for transferring said second telecommunications device control command to said at least one telecommunications device using the communications path, and wherein said at least one telecommunications device consists of a PBX telephone switch.

39. The apparatus of claim 38 wherein said computer database system and said control means comprise at least a portion of one of the at least two telecommunications devices.

40. A telecommunications system installation and management apparatus for controlling the operation of at least two telecommunications devices operatively connected through a communications path with the apparatus, comprising:

a computer database including a plurality of data records containing configuration data used to control the operation of the at least two telecommunications devices; and control means operatively connected with said computer database, said control means operating to access said computer database to retrieve said configuration data and further operating to (a) format said configuration data into first formatted configuration data suitable for a first one of said at least two telecommunications devices, to generate a first telecommunications device control command by converting said first formatted configuration data into a protocol suitable for use with said first one of said at least two telecommunications devices, and to transfer said first telecommunications device control command to said first one of said at least two telecommunications devices, using the communications path; and (b) format said configuration data into second formatted configuration data suitable for a second one of said at least two telecommunications devices, to generate a second telecommunications device control command by converting said second formatted configuration data into a protocol suitable for use with said second one of said at least two telecommunications devices, and to transfer said second telecommunications device control command to said second one of said at least two telecommunications devices, using the communications path, wherein said first one of said at least two telecommunications devices is a PBX telephone switch and said second one of said at least two telecommunication devices is a call accounting system.

41. The telecommunications system installation and management apparatus of claim 40 wherein said configuration data is one of a user name and an extension number.

42. The apparatus of claim 40 wherein said computer database system and said control means comprise at least a portion of one of the at least two telecommunications devices.

43. A telecommunications system installation and management apparatus for controlling the operation of at least two telecommunications devices operatively connected through a communications path with the apparatus, comprising:

a computer database including a plurality of data records containing configuration data used to control the operation of the at least two telecommunications devices; and control means operatively connected with said computer database, said control means operating to access said computer database to retrieve said configuration data and further operating to (a) format said configuration data into first formatted configuration data suitable for a first one of said at least two telecommunications devices, to generate a first telecommunications device control command by converting said first formatted configuration data into a protocol suitable for use with said first one of said at least two telecommunications devices, and to transfer said first telecommunications device control command to said first one of said at least two telecommunications devices, using the communications path; and (b) format said configuration data into second formatted configuration data suitable for a second one of said at least two telecommunications devices, to generate a second telecommunications device control command by converting said second formatted configuration data into a protocol suitable for use with said second one of said at least two telecommunications devices, and to transfer said second telecommunications device control command to said second one of said at least two telecommunications devices, using the communications path, wherein said first one of said at least two telecommunications devices is a PBX telephone switch and said second one of said at least two telecommunication devices is a voice messaging system.

44. The telecommunications system installation and management apparatus of claim 43 wherein said configuration data is one of a user name and an extension number.

45. The apparatus of claim 43 wherein said computer database system and said control means comprise at least a portion of one of the at least two telecommunications devices.

46. A telecommunications system installation and management apparatus for controlling the operation of at least one telecommunications device having a database containing configuration data used to control the operation of the device stored therein and operatively connected through a communications path with the apparatus, comprising:
- a computer database including a plurality of data records containing configuration data used to control the operation of the at least one telecommunications device;
- data input means for receiving configuration data from a user to be stored in one of said plurality of data records in said computer database; and
- control means operatively connected with said computer database and said data input means, said control means operating to store said received configuration data in said one of said plurality of records and to modify at least one other of said plurality of records in response to said received configuration data,
- wherein said control means further functions to detect a change in said configuration data in said computer database system and operates to retrieve said configuration data to be transferred to one of the at least two telecommunications devices from said computer database system in response to said change.

47. The apparatus of claim 46 wherein said computer database system and said control means comprise at least a portion of one of the at least two telecommunications devices.

48. The telecommunications system installation and management apparatus of claim 46 wherein said at least one telecommunications device consists of a call accounting system.

49. The telecommunications system installation and management apparatus of claim 46 wherein said at least one telecommunications device consists of a voice messaging system.

50. The telecommunications system installation and management apparatus of claim 46 wherein said control means further operates to generate a first telecommunications device control command by converting said received configuration data into a protocol suitable for use with said at least one telecommunications device, and for transferring said first telecommunications device control command to said at least one telecommunications device using the communications path.

51. The telecommunications system installation and management apparatus of claim 50 wherein said control means further operates to access said at least one other of said plurality of records to retrieve modified configuration data therefrom, to generate a second telecommunications device control command by converting said modified configuration data into a protocol suitable for use with said at least one telecommunications device, and for transferring said second telecommunications device control command to said at least one telecommunications device using the communications path.

52. The telecommunications system installation and management apparatus of claim 51 wherein said at least one telecommunications device comprises a PBX telephone switch and a call accounting system, and said first telecommunications device control command is transferred to said PBX telephone switch and said second telecommunications device control command is transferred to said call accounting system.

53. The telecommunications system installation and management apparatus of claim 51 wherein said at least one telecommunications device comprises a PBX telephone switch and a voice messaging system, and said first telecommunications device control command is transferred to said PBX telephone switch and said second telecommunications device control command is transferred to said voice messaging system.

54. The telecommunications system installation and management apparatus of claim 51 wherein said at least one telecommunications device consists of a PBX telephone switch.

55. A telecommunications system installation and management apparatus for controlling the operation of at least one telecommunications device having a database containing configuration data used to control the operation of the device stored therein and operatively connected through a communications path with the apparatus, comprising:
- a computer database including a plurality of data records containing configuration data used to control the operation of the at least one telecommunications device;
- data input means for receiving configuration data from a user to be stored in one of said plurality of data records in said computer database; and
- control means operatively connected with said computer database and said data input means, said control means operating to store said received configuration data in said one of said plurality of records and to modify at least one other of said plurality of records in response to said received configuration data,
- wherein said control means further operates to synchronize the configuration data stored within the computer database of the apparatus with the configuration data stored in said at least one telecommunications device.

56. The apparatus of claim 55 wherein said computer database system and said control means comprise at least a portion of one of the at least two telecommunications devices.

57. The telecommunications system installation and management apparatus of claim 55 wherein said at least one telecommunications device consists of a call accounting system.

58. The telecommunications system installation and management apparatus of claim 55 wherein said at least one telecommunications device consists of a voice messaging system.

59. The telecommunications system installation and management apparatus of claim 55 wherein said control means further operates to generate a first telecommunications device control command by converting said received configuration data into a protocol suitable for use with said at least one telecommunications device, and for transferring said first telecommunications device control command to said at least one telecommunications device using the communications path.

60. The telecommunications system installation and management apparatus of claim 59 wherein said control means further operates to access said at least one other of said plurality of records to retrieve modified configuration data therefrom, to generate a second telecommunications device control command by converting said modified configuration data into a protocol suitable for use with said at least one telecommunications device, and for transferring said second telecommunications device control command to said at least one telecommunications device using the communications path.

61. The telecommunications system installation and management apparatus of claim 60 wherein said at least one telecommunications device comprises a PBX telephone switch and a call accounting system, and said first telecommunications device control command is transferred to said PBX telephone switch and said second telecommunications device control command is transferred to said call accounting system.

62. The telecommunications system installation and management apparatus of claim 60 wherein said at least one telecommunications device comprises a PBX telephone switch and a voice messaging system, and said first telecommunications device control command is transferred to said PBX telephone switch and said second telecommunications device control command is transferred to said voice messaging system.

63. The telecommunications system installation and management apparatus of claim 60 wherein said at least one telecommunications device consists of a PBX telephone switch.

* * * * *